(12) United States Patent
Ichinose et al.

(10) Patent No.: US 6,288,768 B1
(45) Date of Patent: Sep. 11, 2001

(54) IMAGE READING DEVICE WITH MOVABLE SHEET GUIDE

(76) Inventors: Hayato Ichinose, 448 Hachinoshiri, Ichikawadaimoncho, Nishiyatsushirogun, Yamanashi-ken; Shuji Ishimaru, 593, Enokihara, Hattamura, Nakakomagun, Hattamura, Nakakomagun Yamanashi-ken, both of (JP)

( * ) Notice: Subject to any disclaimer, the term of this patent is extended or adjusted under 35 U.S.C. 154(b) by 0 days.

(21) Appl. No.: 09/233,473

(22) Filed: Jan. 20, 1999

(30) Foreign Application Priority Data

Jan. 23, 1998 (JP) .................................................. 10-011588
Jan. 23, 1998 (JP) .................................................. 10-011589

(51) Int. Cl.[7] ........................... G03B 27/32; G03B 27/52; B65H 5/22
(52) U.S. Cl. ................................ 355/23; 355/24; 271/3.14
(58) Field of Search .................................. 355/23, 24, 75; 271/3.14, 3.19, 4.7; 358/498; 399/367

(56) References Cited

U.S. PATENT DOCUMENTS 5,887,865 * 3/1999 Ishimaru ................................ 271/4.7

FOREIGN PATENT DOCUMENTS 02063262  3/1990  (JP) .
06247642  9/1994  (JP) .
08133551  5/1996  (JP) .

* cited by examiner

*Primary Examiner*—Russell Adams
*Assistant Examiner*—Peter B. Kim
(74) *Attorney, Agent, or Firm*—Kanesaka & Takeuchi

(57) ABSTRACT

An image reading device capable of reading images on the both surfaces of a document in order while moving the document at a prescribed speed includes a platen for reading the document moving at the prescribed speed, a reversible transferring device for moving the document at the prescribed speed along the platen, and a circulating passage for turning the document and sending back to the platen after reading the image on the obverse surface of the document. The circulating passage is composed of at least first and second turning paths for inverting a direction in which the document is transferred to turn the document upside down, so that the images on the obverse and reverse surfaces of the document can be continuously read with a compact mechanism and starting to scan from the same end of the document whenever the document is read.

6 Claims, 17 Drawing Sheets

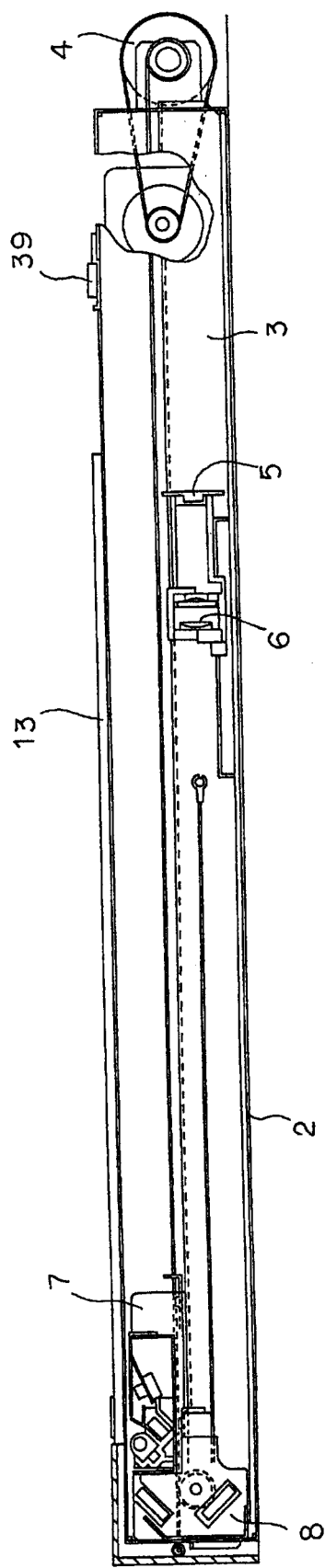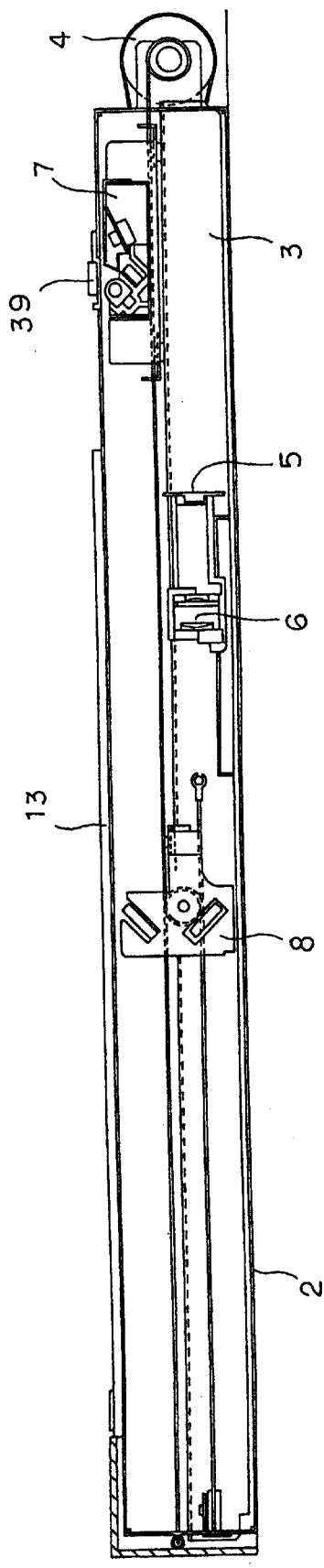

Fig. 8
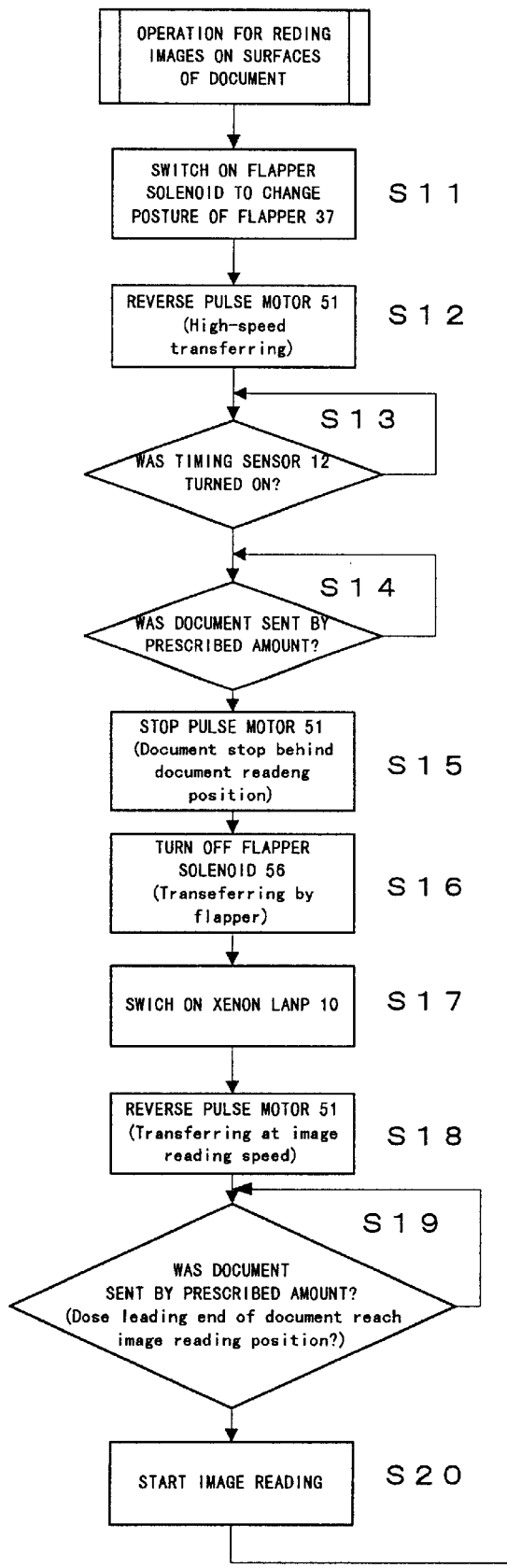
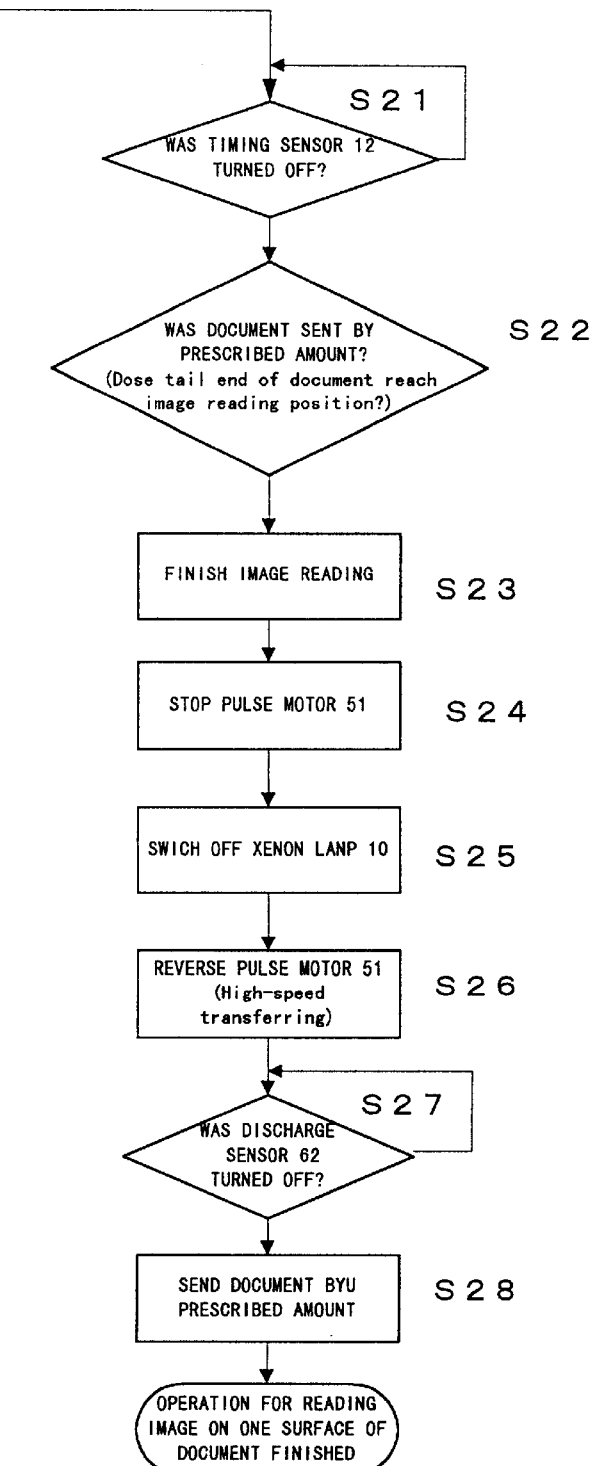

Fig. 10
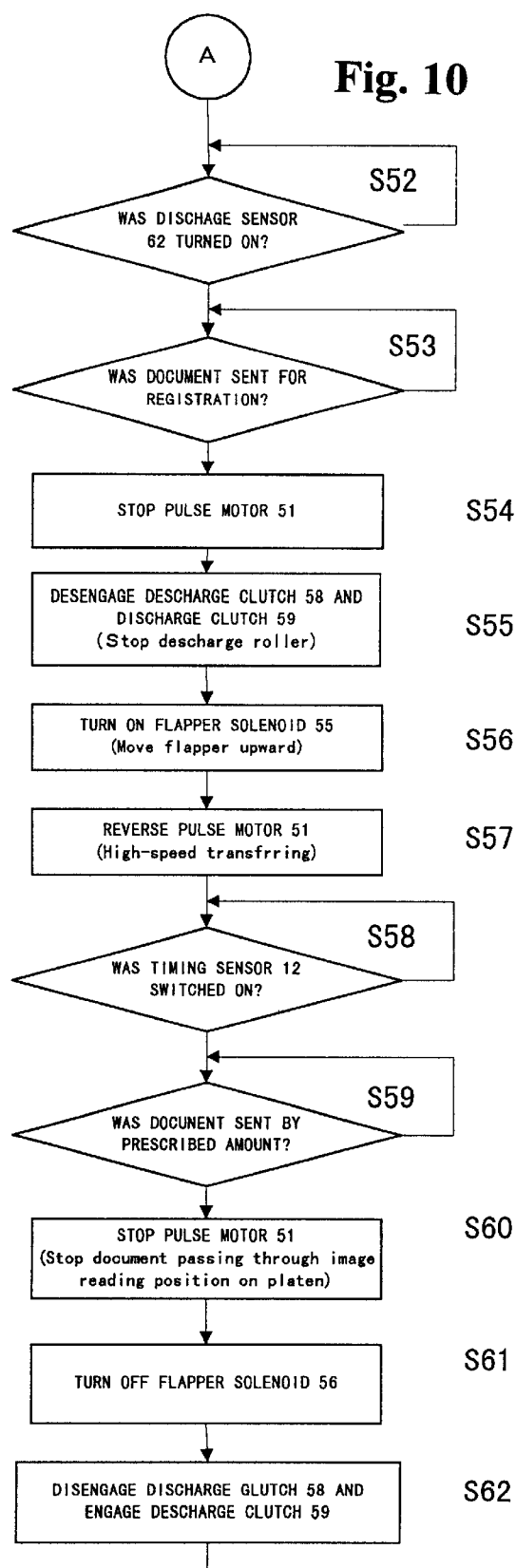
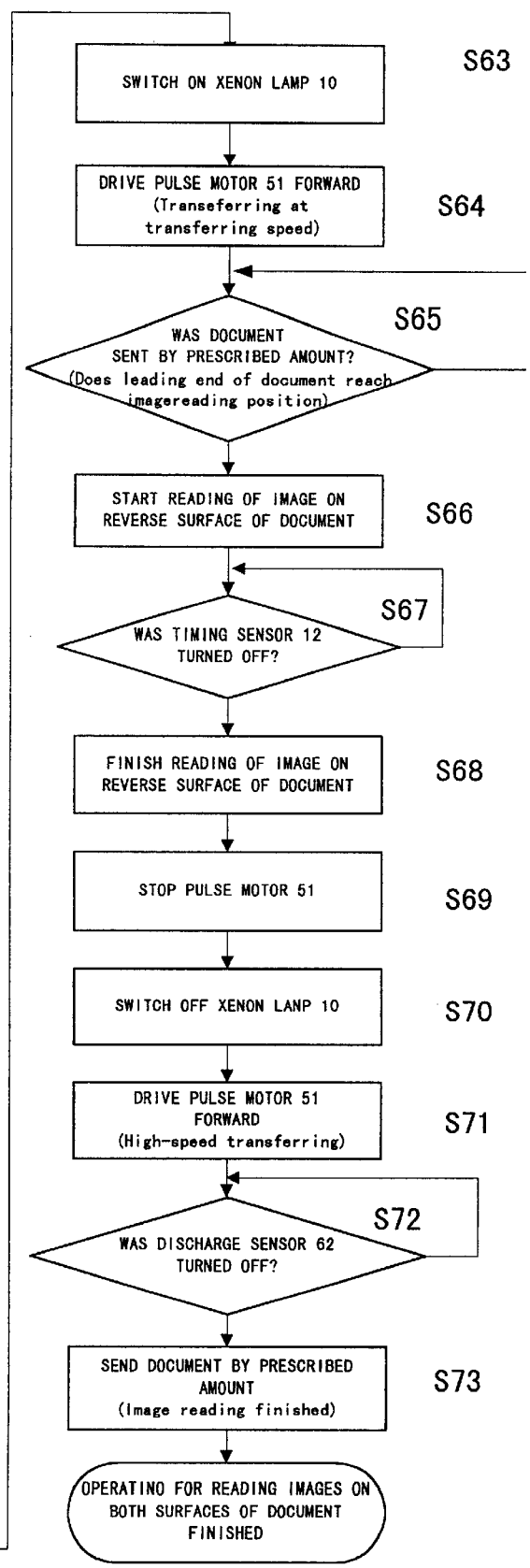

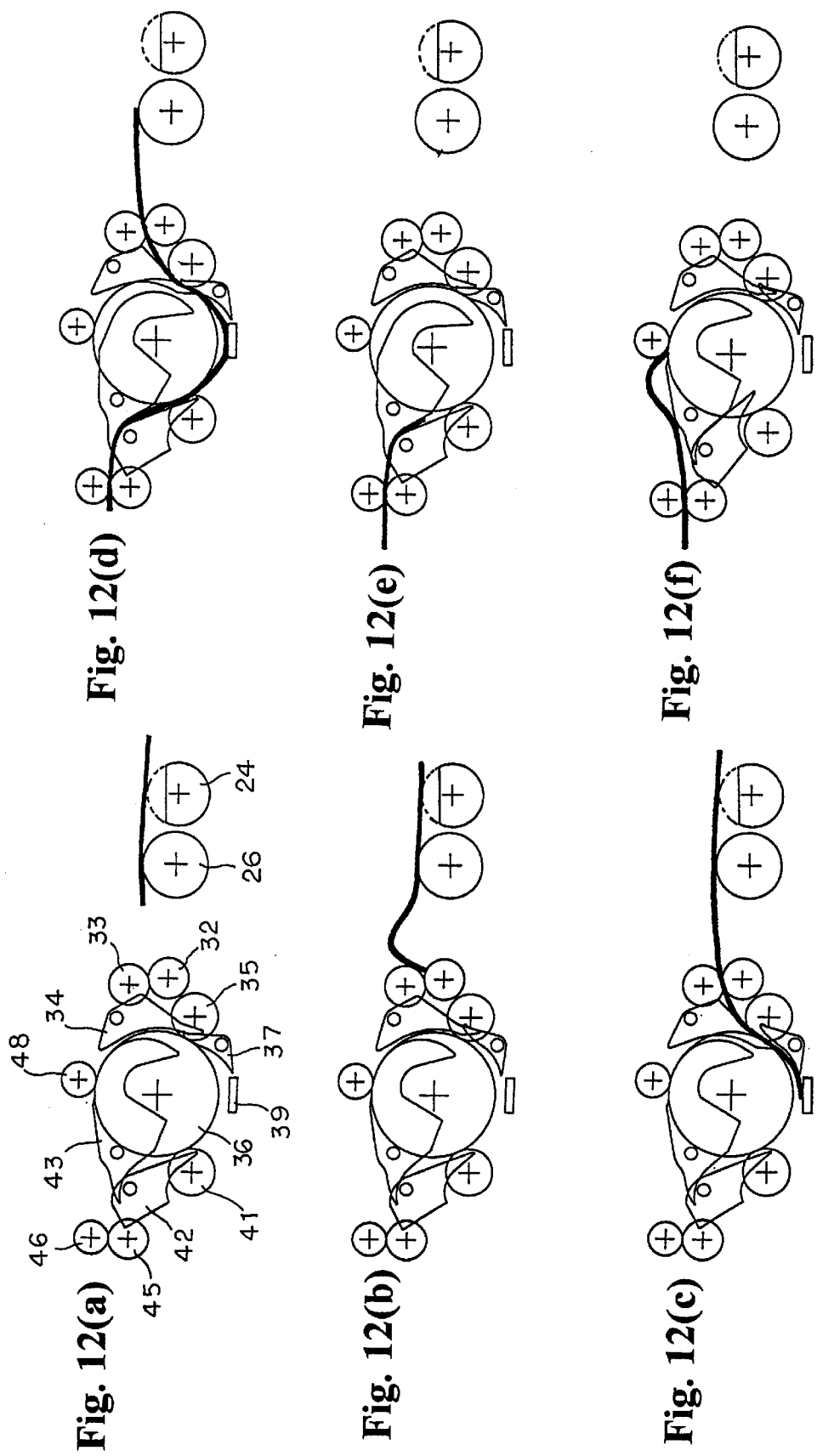

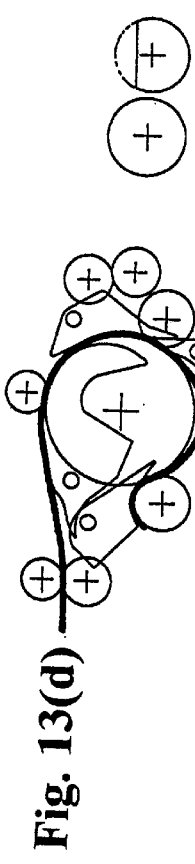
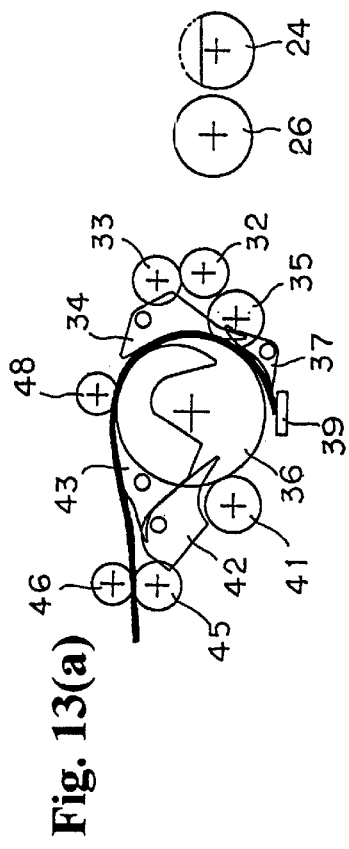
Fig. 13(a)
Fig. 13(b)
Fig. 13(c)
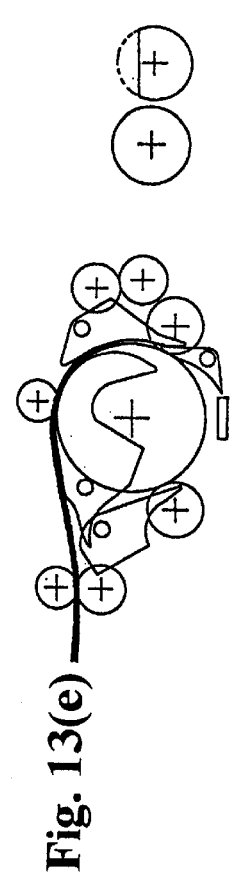
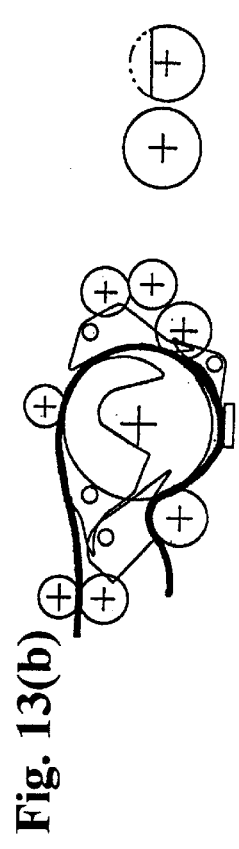
Fig. 13(d)
Fig. 13(e)
Fig. 13(f)
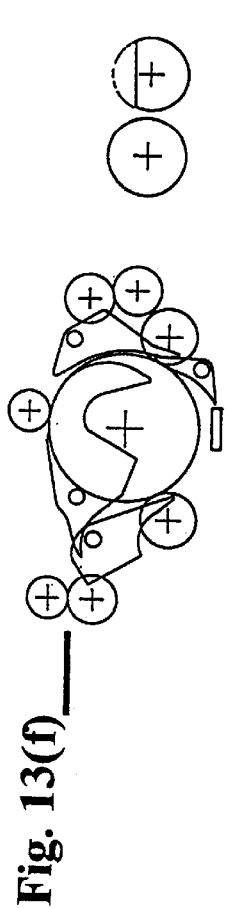
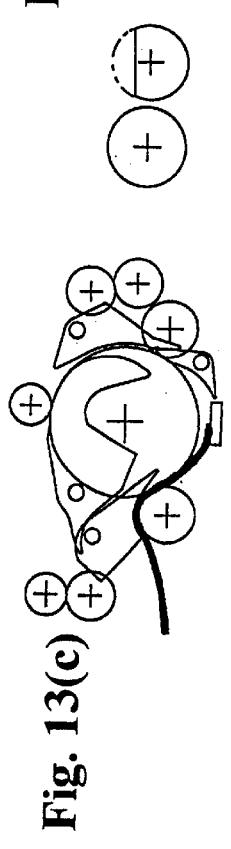

IMAGE READING ROLLER
A2
A3
A1
IMAGE READING POSITION

IMAGE READING ROLLER
B2
B3
A1
IMAGE READING POSITION

IMAGE READING TRANSFERRING ROLLER
DOCUMENT
IMAGE READING POSITION

IMAGE READING TRANSFERRING ROLLER

DOCUMENT

IMAGE READIG POSITION

DOCUMENT DISCHARGE PORT

IMAGE READING DEVICE WITH MOVABLE SHEET GUIDE

BACKGROUND OF THE INVENTION

1. Field of the Invention

This invention relates to an image reading device provided with a reading carriage which is placed at a prescribed fixing position so as to read a document transferred by a document transferring device.

2. Description of the Prior Art

An image reading device used for an image forming device such as a copying machine and facsimile apparatus has a document reading surface opposed to an image reading glass. A carriage of an image reading portion (hereinafter, simply referred to as an "image reading portion") of the image reading device has a function of reading an image on a document while moving from a home position in a sub-scanning direction to subjecting the image of the document to main scanning. In a case that an automatic document feeder (hereinafter, simply referred to as an "ADF") is attached thereto, the document is moved along the reading portion in the sub-scanning direction at a constant speed. Therefore, the aforesaid reading portion is retained at the prescribed standby position and serves to scan the documents fed from the ADF in succession in the main scanning direction so as to read images on the documents. Upon reading the images on the documents, the documents are discharged through a document discharge port.

However, in a case that the document has images on its both surfaces, the obverse and reverse surfaces (the image surface which is first read is called "obverse", and the image surface surface which is secondly read is called "reverse" in the description including the appended claims) should be moved over the image reading position in succession. Accordingly, the image on the obverse surface is first read by moving the document from its one end in the forward direction in such a state that the obverse surface is opposed to the image reading position, and thereafter, the document is turned upside down to read the image on the reverse surface. That is, the turned document is moved over the aforementioned image reading position with its reverse surface opposed to the image reading position. Thus, upon reading the images on the both surfaces of the document, the document is sent out through the document discharge port.

Conventional document transferring mechanisms for use in the document reading device for reading the document having the images on its both surfaces have been disclosed in Japanese Patent Application Public Disclosures HEI 02-63262(A), 06-247642(A) and 08-133551(A).

FIGS. 16(a)–16(d) show a first example of the prior art devices as noted above. In this device, a document sent from a document entrance side on the right side of the drawing is moved from its one end in the forward direction through an image reading position at which a reading portion is placed under a reading feed roller (in the direction from the right side to the left side of the drawing) in such a state that one image surface to be first read faces downward. Consequently, the image on the obverse surface of the document is read by the reading portion FIG. 16(a). Next, after the other end of the document passes through the reading position to complete the reading of the image on the obverse surface, the document stops for a while at the document discharge portion shown on the left side of the drawing FIG. 16(b). Thereafter, the document moves from its other end and goes around the reading feed roller in the clockwise direction so as to pass through the reading position with the reverse surface facing the reading portion. Consequently, the image on the reverse surface of the document is read FIG. 16(c). Then, the document is sent out in the document discharging direction toward the left side of the drawing FIG. 16(D).

FIGS. 17(a)–17(d) show a second example of the prior art devices as noted above. In this conventional device, a document fed from the document entrance side on the right side of the drawing is moved from its one end in the forward direction through a reading position at which a reading portion is placed under a reading feed roller in such a state that one image surface to be first read faces downward in the same manner as the first example described above FIG. 17(a). Consequently, the image on the obverse surface of the document is read by the reading portion. After reading the image on the obverse surface of the document, the document is moved from its one end toward the document discharge side on the left side of the drawing in the clockwise direction (may be moved even in the counterclockwise direction) so as to be turned upside down FIG. 17(b). The turned document is next moved over the reading position in the reverse direction (from the left side to the right side of the drawing) with its reverse surface facing the reading portion, so that the image on the reverse surface is read FIG. 17(c). Then, the document is moved around the reading feed roller in the counterclockwise direction while reading the image on the reverse surface of the document and sent out in the document discharging direction FIG. 17(d).

However, in the first example of the conventional devices, the directions in which the images of the obverse and reverse surfaces of the document are read are opposite to each other. Namely, the obverse surface of the document to be first read is scanned from the leading end of the document, but the reverse surface to be read later is scanned from the tail end of the document. Thus, this conventional device entails problem such as difficulty in bringing the images, which are read from the obverse and reverse surfaces of the document and should be reproduced on a sheet of paper, into perfect coincidence on the both sides of the sheet.

On the other hand, the second example of the conventional devices is free from the disadvantage brought about by the first example, because the images on the obverse and reverse surfaces are read in the same direction in the second example. However, after reading the image on the obverse surface of the document, the document must be moved from its leading end to be turned upside down on the document discharge side on the left side of the drawing. Besides, even a document of any size is required to prevent its leading and tail ends from overlapping with each other at the reading position when turning on the document discharge side. Therefore, this conventional device calls for a large space for turning the document upside down on the document discharge side, resulting in a large overall size of the ADF device.

OBJECT OF THE INVENTION

An object of the present invention is to provide an image reading device capable of continuously reading images on the obverse and reverse surfaces of a document with a compact mechanism and starting to scan from the same end of the document whenever the document is read.

SUMMARY OF THE INVENTION

To attain the object described above according to this invention, there is provided an image reading device for reading the obverse and reverse surfaces of a document while moving the document at a prescribed speed, which comprises a platen for reading the document moving at the prescribed speed, reversible transferring means for moving the document at the prescribed speed along the platen, and a circulating passage for turning the document and sending back to the platen after reading the image on the obverse surface of the document. The circulating passage includes at least first and second turning paths for inverting a direction in which the document is transferred to turn the document upside down.

BRIEF DESCRIPTION OF THE DRAWINGS

FIG. 4(a) and FIG. 4(b) are explanatory side views of the image reading device, illustrating the states of changing the position of the image reading carriage.

FIG. 8 is a flowchart of a process for reading an image on one surface of the document in the device of the invention.

FIG. 10 is a flowchart of a succeeding process following the process of FIG. 9 for reading images on both image surfaces of the document.

FIG. 12(a) to FIG. 12(f) are schematic side views showing movements of the document from the document prefeeding state to the state of reading the images on the reverse surface of the document.

FIG. 13(a) to FIG. 13(f) are schematic side views showing succeeding movements of the document from the document prefeeding state to the state of reading the images on the reverse surface of the document, following the state of FIG. 12(f).

DESCRIPTION OF THE PREFERRED EMBODIMENTS

The image reading device having the document transferring mechanism according to the present invention will be described hereinafter in detail with reference to the accompanying drawings.

Figure 1:
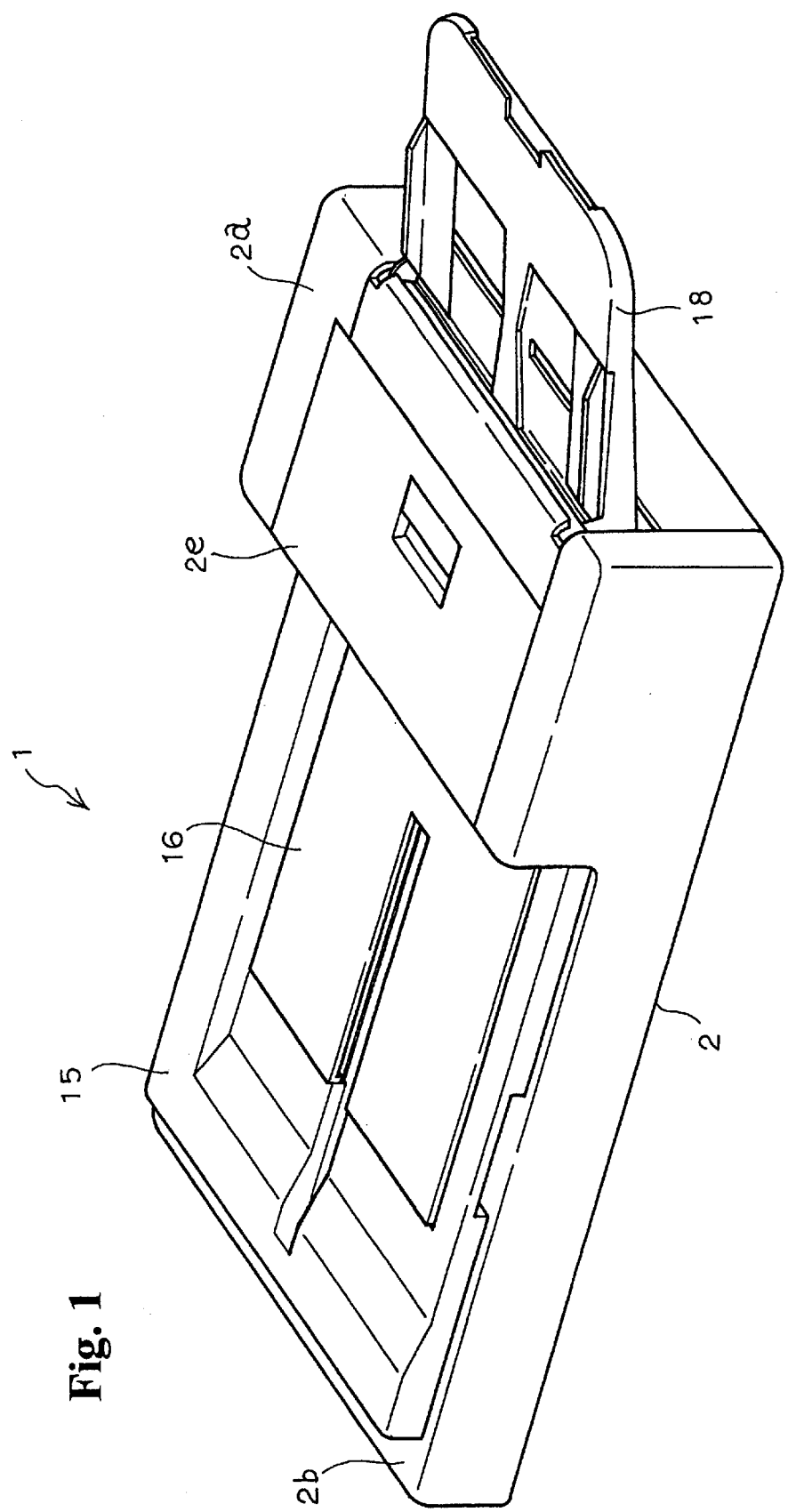
FIG. 1 is a perspective view showing an image reading device according to this invention.

FIG. 1 is a perspective view showing the image reading device 1 according to this invention. The image reading device 1 functions as not only a document reader having the document transferring mechanism for reading a moving document, but also an image scanner for reading a stationary document. A frame 2 of the image reading device 1 may be divided into two parts. One of the divided parts is placed at one end portion of the frame 2 and comprises a document reading portion including the document transferring mechanism for sending the document into the inside of a frame 2a so as to enable various images on the document such as text and patterns to be read out, and a scanner portion for scanning and reading the images on the document placed on the top of a frame 2b by using a scanner. On one side of the frame 2a, there is installed a document feeding tray 18 for permitting a plurality of documents to be set thereon, so that the documents are sent one by one into the inside of the frame 2a to perform image reading. (Herein, the term "scanning and reading of images on the image surface of the document" is abbreviated simply as "image reading" in some cases.)

On the top of the frame 2b, there is disposed a cover 15 for depressing the document placed on upper surface of the frame 2b. The cover 15 is pivotally supported on the one side edge of the frame 2 in the state openably rotatable upward about a rotational shaft. FIG. 1 shows the closed state of the cover 15. The cover 15 is provided on its upper surface with a pocket cover 16 independently operable upward so that a document jammed under the cover 15 can be removed. The frame 2a has an openable frame cover 2e so that a document jammed in the frame 2a can be removed.

Figure 2:
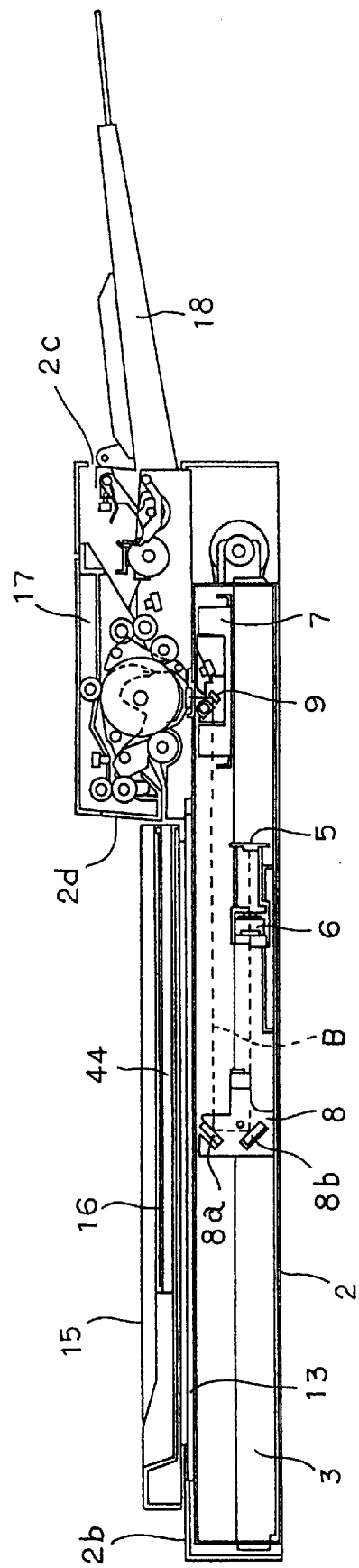
FIG. 2 is a seethrough view showing the image reading device of FIG. 1.

FIG. 2 is a seethrough view of the image reading device 1 in the state of closing the cover 15. On the side of the document feeding tray 18, a document entrance port 2c is formed for introducing the document into the inside of the frame 2a therethrough. The document can be inserted and sent to the document transferring mechanism 17 in the frame 2a through the document entrance port 2c.

On the opposite side to the document feeding tray 18, a document discharge port 2d is formed for sending out the document from the document transferring mechanism 17.

Within the cover 15, a document accommodating portion 44 is formed for accommodating the document in the state of closing the pocket cover 16. Thus, when the cover 15 is closed, the document sent out from the document transferring mechanism 17 can be temporarily stored in the document accommodating portion 44 so as not to take out by mistake the document temporarily sent out from the document transferring mechanism to the document accommodating portion 44. Even when a document is present on the platen cover 15, the document can be sent into the document accommodating portion 44 without being obstructed by the document on the platen cover. When the document temporarily entering the document accommodating portion 44 is jammed, it can be taken out therefrom by uncovering the pocket cover 16 from the cover 15.

The upper surface of the frame 2b is covered with a document reading glass 13 on which the document is placed so as to read the image of the lower surface thereof. The cover 15 has a pad attached to its lower surface facing the document reading glass 13. When the document placed on the document reading glass 13 is covered with the cover 15, it is stably depressed against the document reading glass 13 by the pad.

Within the frame 2, there is disposed a rail 3 extending from the cover 15 to the document transferring mechanism 17. The rail 3 is provided with a mirror carriage 8 and an image reading carriage 7 for reading the image on the document, which are movable along the rail. The image reading carriage 7 and the mirror carriage 8 are moved by driving a motor and wire pulleys (not shown) and operating a driving system 4 including a wire for transmitting a driving force to the image reading carriage 7 and mirror carriage 8. On the bottom of the frame 2, there are installed a lens 6 for focussing light reflected from the document being scanned, and a CCD means 5 such as a CCD linear image sensor for converting the light focussed by the lens 6 into electric image signals. In place of the CCD linear image sensor, a two-dimensional CCD image sensor may be used though it calls on a control system for large ability of processing the image signals.

The image reading carriage 7 has functions of not only reading the document being transferred by the document transferring mechanism 17, but also reading the document stationarily placed on the frame 2b.

Figure 3:
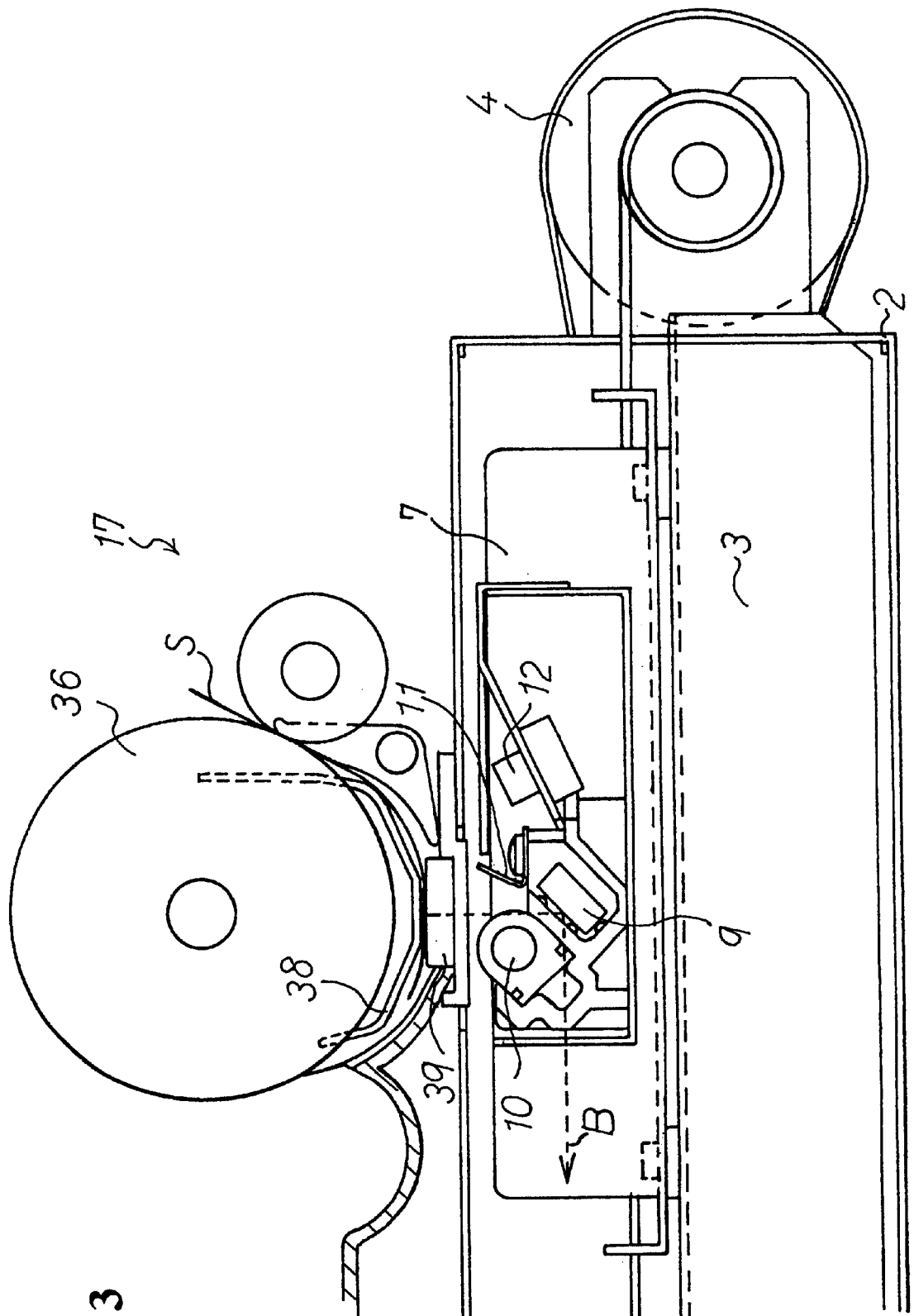
FIG. 3 is a side view showing an image reading carriage situated at an image reading position for reading a document by using a document transferring mechanism.

FIG. 3 shows the image reading carriage 7 located beneath the document transferring mechanism 17 for reading the document. The image reading carriage 7 can read documents transferred by an image reading transferring roller 36, so that the document S transferred to a document reading position under the image reading transferring roller 36 can be read.

The image reading carriage 7 is composed of a lamp 10, a mirror 9, a reflecting plate 11, and a timing sensor 12. Beneath the image reading transferring roller 36, an ADF platen glass 39 is fixedly mounted. Between the platen glass 39 and the roller 36, a platen guide 38 is mounted. Along the platen guide 38, a document transferring passage is formed for performing image reading of the document moving therethrough. The document S passes through between the platen guide 38 and the ADF platen glass 39. The document S is moved along the document transferring passage by the image reading transferring roller 36 in rotation while being elastically urged downward by the platen guide 38 to come in contact with the upper surface of the ADF platen glass 39.

The document S passing along the upper surface of the ADF platen glass 39 is illuminated from under the document by the lamp 10 of the image reading carriage 7. The reflected light from the document is reflected by the mirror 9 as indicated by the broken line B in FIG. 2 and advances toward the mirror carriage 8 in parallel to the rail 3. As shown in FIG. 2, mirrors 8a and 8b mounted on the mirror carriage 8 are opposed to each other, making a right angle with each other so as to allow the light reflected by the mirror 9 to be refracted toward a CCD 5. The light reflected by the mirrors 8a and 8b is focussed by the lens 6 on the CCD 5, so that image data on the document S are converted to electric image signals by the CCD 5.

As the lamp 10, there may be used, for instance, a slender xenon lamp which extends parallel to and over the image surface of the document. The reflecting plate 11 is symmetrically opposed to the lamp 10 relative to the reflected light from the document placed at the image reading position, so that the document S at the image reading position can be uniformly illuminated symmetrically from the right and left sides with the illuminating light emitted from the lamp 10 and the light irradiated by the reflecting plate 11, which is obtained by reflecting the light from the lamp 10 with the reflecting plate 11.

The timing sensor 12 serving to detect the document S passing by may be of a reflection type sensor composed of a light emitting element and a photodetecting element. The light emitting element emits a document detecting light toward the image reading position through which the document S is moved by the image reading transferring roller 36. The photodetecting element has a function of receiving the light reflected by the document passing through the image reading position. The timing sensor 12 is turned on when the document S reaches an area illuminated by the light emitting element to cause the intensity of the light incident on the photodetecting element to be increased. As a reflecting member for reflecting the light emitted from the light emitting element, there may be used the surface of the platen guide 38 or the image reading transferring roller 36, which is made low in reflectance. Instead, an additional reflecting member may of course be mounted on the side of the image reading transferring roller 36.

By disposing the timing sensor 12 along with the mirror 9 on the image reading transferring carriage 7 so as to detect the document S on the ADF platen glass 39 at the upstream position of the image reading position extremely close to the ADF platen glass 39, the scanning of the document S by use of the CCD 5 can be precisely started with ease without a time lag of starting the image reading because the leading end of the document S moving along the ADF platen glass 39 can be detected immediately before the commencement of reading.

FIGS. 4(a) and 4(b) are side views of the image reading carriage 7 at different positions. The image reading carriage 7 in FIG. 4(a) is placed at the home position on the side of the frame 2b of the frame 2 shown in FIG. 1, and that in FIG. 4(b) is moved toward the frame 2a and placed at a prescribed position for reading the document transferred by the document transferring mechanism 17 shown in FIG. 2.

The image reading carriage 7 is movable along the rail 3 between the positions shown in FIGS. 4(a) and 4(b), so that the document on the document reading glass 13 is illuminated by the lamp 10 and optically scanned by the CCD 5 while moving the image reading carriage 7 under the document reading glass 13, like an image scanner. At the same time, the mirror carriage 8 moves together with the image reading carriage 7, but the moving extent in which the mirror carriage 8 is movable is just half that of the image reading carriage 7. Thus, the optical path length from the image reading carriage 7 to the CCD 5 through the mirror 9 and the mirrors 8a and 8b of the mirror carriage 8 can be fixed. Therefore, the image reading device of the invention can be used both as a document reader by driving the document transferring mechanism 17 and an image scanner by moving the image reading carriage under the document reading glass 13. Incidentally, the CCD 5 may be incorporated in the image reading carriage 7 so as to read the document by moving the CCD 5 along with the image reading carriage 7. In this case, the optical path length from the image reading position to the CCD 5 must be fixed.

When moving the image reading carriage 7 from the image reading position of the scanner to the prescribed position capable of reading the image on the document with the document transferring mechanism 17 in order to read the image on the document by operating the document transferring mechanism 17, the image reading carriage 7 is not always stopped precisely at the prescribed position. That is, strictly speaking, there are cases that the image reading carriage 7 stops at a position slightly deviating from the prescribed position due to tolerances of mechanical component parts constituting the document transferring mechanism and the inertia of the moving elements.

However, since the image reading device 1 of the invention is provided on the image reading carriage 7 with the lamp 10, mirror 9 and timing sensor 12, the positional relation between the light irradiating position, i.e. image reading position, at which the light is irradiated onto the document by the lamp 10 to detect the light reflected from the document through the mirror 9, and the position at which the document is detected by the timing sensor 12 is always kept constant. In other words, the relation between the position at which the document on the ADF platen glass 39 is read by the CCD 5 and the position at which the leading end of the document is detected by the timing sensor 12 does not vary even when the image reading carriage 7 changes its position relative to the ADF platen glass 39. Accordingly, by moving the document forward by the predetermined distance after detecting the document by the timing sensor 12, the leading end of the document accurately arrives at the prescribed image reading position. Thus, the image reading carriage 7 can easily be controlled without need to go to the trouble of moving it exactly to the prescribed position for reading the document under the document transferring mechanism 17.

As described above, the timing of moving the image reading carriage 7 synchronously with the other moving components of the device can easily be accomplished by mounting the timing sensor 12 on the image reading carriage 7 without precisely controlling the positioning of the image reading carriage 7 at the prescribed image reading position. Although the timing sensor 12 is mounted on the image reading carriage 7 as noted above, the timing sensor 12 may be mounted on the document transferring mechanism 17. In that case, a reflecting member may be mounted on the image reading carriage 7. As another modified embodiment, the timing sensor 12 may be of a transmission type optical sensor, instead of the reflection type optical sensor as in the foregoing embodiment. In the case of using the light transmission type optical sensor as the timing sensor, one of light emitting element and photodetecting element which constitute the optical sensor may be mounted on the image reading carriage 7, and the other element may be mounted on the document transferring mechanism 17, so as to allow the light issued from the light emitting element to be incident on the photodetecting element. In this case, when the document S does not arrive at between the light emitting element and the photodetecting element, the light emitted from the light emitting element reaches the photodetecting element. When the document S enters between the light emitting element and the photodetecting element, the light emitted from the light emitting element is blocked off by the document. Thus, the existence of the document can be recognized by checking the output signal from the timing sensor. By using the light transmission type optical sensor as the timing sensor, the problem suffered by the reflection type optical sensor such that the existence of the document is misjudged due to unevenness of the intensity of light reflected by the document can be solved.

Figure 5:
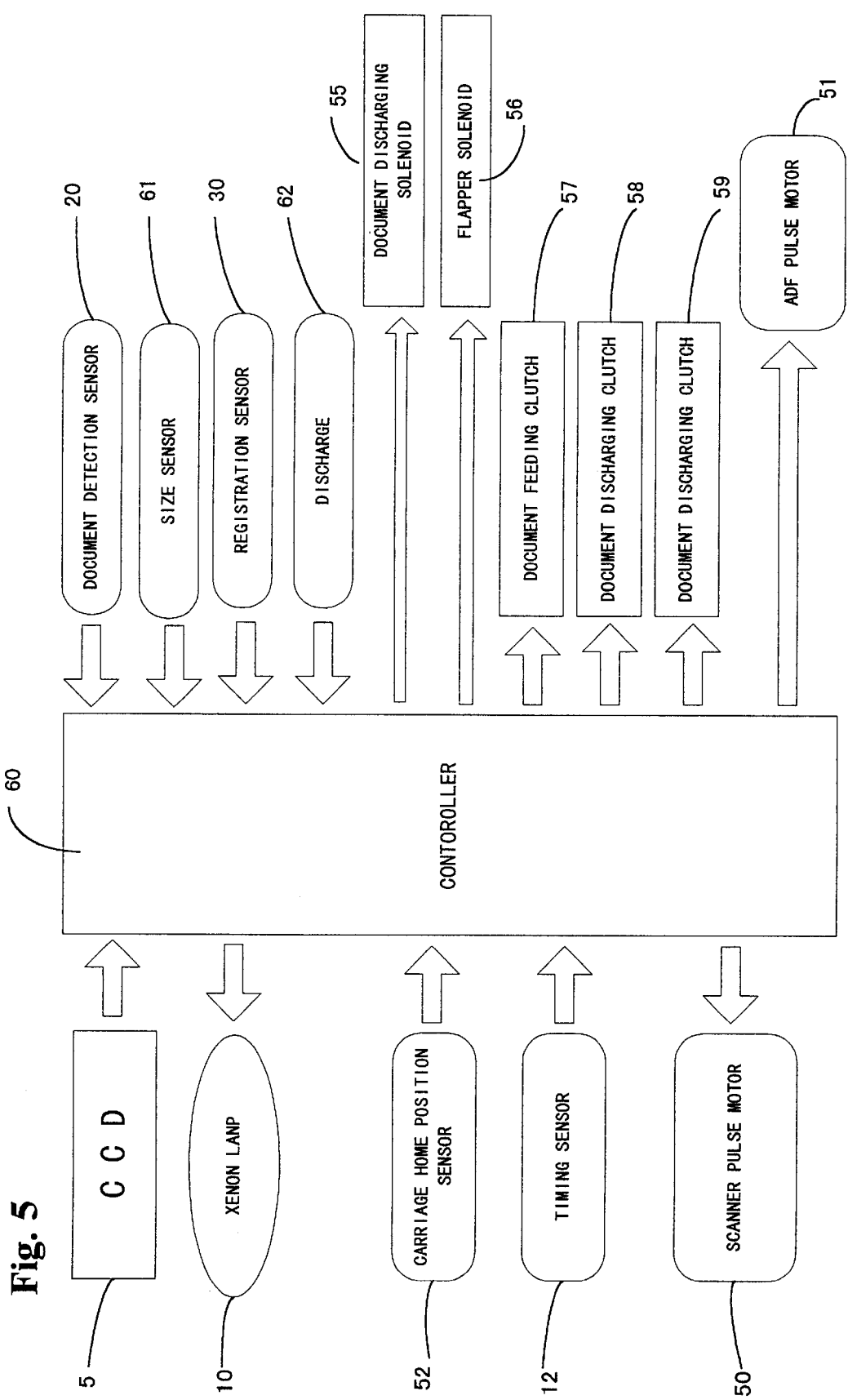
FIG. 5 is a block diagram of a system for controlling the image reading operation and document transferring operation in the image reading device.

Next, FIG. 5 is a block diagram of a controlling system for transferring the document to scan the document. A controller 60 consists of a CPU (central processing unit) for performing arithmetic operation for the image reading device 1, and memory means including RAM and ROM for storing a program for controlling the device. The controller 60 controls separately the image scanning part and the document transferring mechanism 17 of the device 1.

In the image scanning part, the CCD 5 and the lamp 10 for issuing the illumination light are controlled to perform the image reading operation as described above with reference to FIG. 3. A carriage home sensor 52 is disposed for detecting the image reading carriage 7 at the home position.

By positioning the image reading carriage 7 at the home position before performing the document scanning operation as illustrated in FIGS. 4(a) and 4(b), the positional relation in which the image reading carriage 7 moves during the document scanning operation is determined. A scanner pulse motor 50 is used for moving the image reading carriage 7 along the rail 3. The rotation produced by the pulse motor 50 is transmitted to a driving system 4 to move the image reading carriage 7. With the movement of the image reading carriage 7, the lower surface of the document is scanned. The size of the document placed on the document reading glass 13 is recognized by prescanning the document before reading the image on the document. Namely, in general, the document is roughly scanned in advance to determine the size of the document. In brief, since the image reading carriage 7 is used both as a document reader by driving the document transferring mechanism 17 and an image scanner by moving the image reading carriage under the document reading glass 13, the timing sensor 12 is moved with the image reading carriage 7. Therefore, the CCD 5 and the lamp 10 are shown on the scanner side in the block diagram for the convenience of description.

In the document transferring mechanism (ADF) 17, the existence of the document on the document feeding tray 18 is detected by a document detection sensor 20. A size sensor 61 serves to detect the width of the document. Under the control of a registration sensor 30 for checking whether or not the document is aligned, the document is on standby at a registration position. A document discharge sensor 62 serves to determine the position of the document when the document is discharged out of the frame 2a through the document discharge port 2d. A document feeding solenoid 55 is used as a driving source for aligning the edges of documents stacked on the document feeding tray 18 and depressing the documents when feeding the documents one by one into the inside of the document transferring mechanism 17. A flapper solenoid 56, document feeding clutch 57, document discharging clutches 58 and 59, and an ADF pulse motor 51 are controlled in accordance with the operation of performing obverse surface reading or reverse surface reading, as described in detail later.

Figure 6:
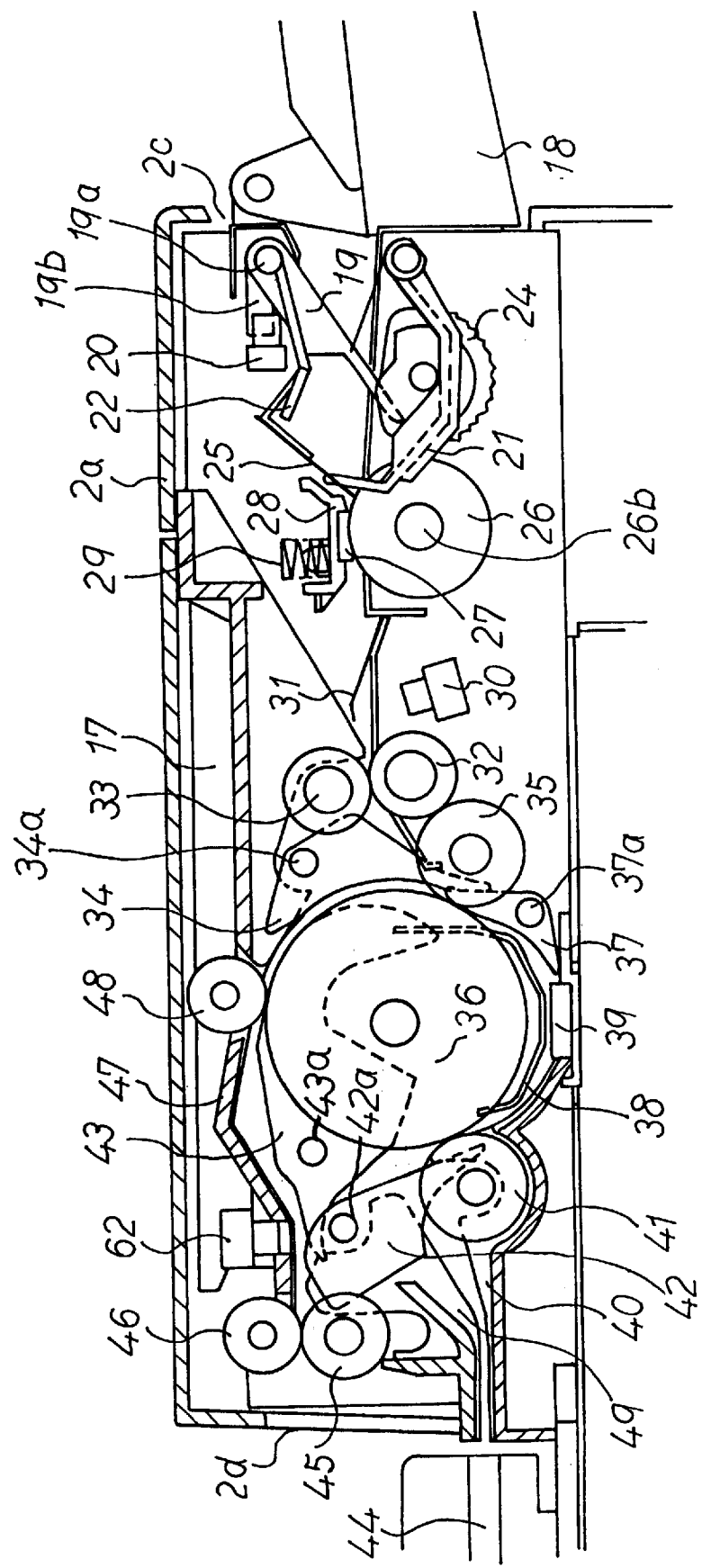
FIG. 6 is an enlarged view of the document transferring mechanism.

FIG. 6 is an enlarged side view of the document transferring mechanism 17. The document feeding tray 18 is disposed close to the document transferring mechanism 17. Near the document entrance port 2c of the frame 2, there is disposed a document detecting arm 19 rotatable about a rotational shaft 19a. When one or more documents are placed on the document feeding tray 18 and inserted into the document entrance port 2c, the document detecting arm 19 is depressed by the documents thus inserted and rotated around the rotational shaft 19a in the clockwise direction from the normal state shown in FIG. 6. As a result, the document detection sensor 20 is switched on by an accompanying arm 19b moved in conjunction with the document detecting arm 19, thus to recognize the existence of the documents set on the device.

The document detection sensor 20 is composed of a light emitting element and a photodetecting element, so that the photodetecting element is switched on or off to recognize the existence of the documents in accordance with the state in which the light emitted from the light emitting element is permitted to reach the photodetecting element or blocked off by the accompanying arm 19b. There is further disposed a sensor, though not shown, for detecting the size of the document, which is composed of sets of light emitting elements and photodetecting elements arranged opposite vertically relative to the surface of the document. On the rotational shaft 19a, a weight 22 which is operated by a not-shown document feeding solenoid is mounted for bringing the document into press contact with a pickup roller 24 when feeding the document. Further, a document shutter 21 is disposed for restricting the leading ends of the documents stacked on the document feeding tray 18. Since the leading ends of the documents are trued up by the document shutter 21, the documents are positioned appropriatedly on the document feeding tray. The document shutter 21 is actuated by the document feeding solenoid 55 as well as the weight 22. The pickup roller 24 is formed in a semicircular column so as to transfer the document toward separation roller 26 and separation pad 27, and driven by the ADF pulse motor 51 through the document feeding clutch 57 which is not illustrated.

In order to send out one of the documents stacked on the tray, the document feeding clutch 57 is engaged to rotate the ADF pulse motor 51 in the forward direction, and the document shutter 21 is shifted downward to release the documents on the tray. Then, the pickup roller 24 is rotated in the counterclockwise direction in FIG. 6, thus to send the document on the pickup roller 24 in the downsteam direction.

On the downstream thereof, there are disposed the separation roller 26, separation pad 27, pad holder 28 and pad-pressing spring 29. The separation pad 27 is forced toward the separation roller 26 by means of the pad-pressing spring 29 through the pad holder 28 so as to come into contact with the peripheral surface of the separation roller 26. As a result, only one of the documents stacked on the tray is allowed to pass through between the separation pad and separation roller, but the remaining documents are kept advancing.

Between the separation pad 27 and the document shutter 21, there is placed a document dressing plate 25 with its free end slightly separated from the separation roller 26. This document dressing plate 25 serves as a supplementary element for allowing only one document to pass through a gap between the separation pad 27 and the document dressing plate 25, but preventing a plurality of documents from passing therethrough. Thus, with the document dressing plate 25, only the lowermost document of the documents stacked on the tray and pressed downward by separation means as noted above is sent in the downstream direction, departing from the upper documents. The separation roller 26 is selectively connected to the ADF pulse motor 51 by operating the document feeding clutch 57 so as to rotate around rotational shaft 26b in the counterclockwise direction in the drawing.

Between the separation roller 26 and the image reading transferring roller 36, there are placed a registration loop guide film 31, the registration sensor 30 and the registration rollers 32 and 33. By the registration loop guide film 31, the document transferred by the separation roller 26 is supported, so as to block the leading end of the document to cause the document to be curved (loop state) in the standby state before effecting the image reading operation. The registration roller 33 is selectively driven by the ADF pulse motor 51 when disengaging the document feeding clutch 57. The registration roller 32 is a follower roller rotatable with the movement of the document.

On the periphery of the image reading transferring roller 36, there are disposed two flappers 34 and 37 rotatable about rotational shafts 34a and 37a, respectively. Adjacent to the registration roller 32, a transferring roller 35 is mounted between the flappers 34 and 37 and comes into contact with the image reading transferring roller 36 so as to be rotated with the image reading transferring roller 36. Further, a registration small roller 48 is mounted on the image reading transferring roller 36, coming into contact with the roller 36 to be rotated with the roller 36. The document transferring passage is formed around the image reading transferring roller 36 in conjunction with the flapper or sheet guide 37. This mechanism makes it possible to allow the document fed through between the transferring roller 35 and the image reading transferring roller 36 to be sent exactly to between the image reading transferring roller 36 and flapper 37, and the document to be transferred through the passage between the ADF platen glass 39 and the registration small roller 48 along the periphery of the image reading transferring roller 36. Between the image reading transferring roller 36 and the ADF platen glass 39, the platen guide 38 is disposed for pressing the document toward the ADF platen glass 39.

On the side of the document discharge port 2d of the image reading transferring roller 36, there is disposed a transferring roller 41 driven by the image reading transferring roller 36. Flappers 42 and 43 rotatable about the rotational shafts 42a and 43a are provided for switching the direction of moving the document. Adjacent to the document discharge port 2d, there are disposed a discharge roller 45 and another discharge roller 46 driven by the discharge roller 45. The flapper 42 serves to selectively direct the document sent by the transferring roller 41 toward a transferring guide 49 or a transferring guide 47. The flapper 42 selectively forms a transferring passage from the transferring roller 41 to the discharge roller 45 or a transferring passage from the discharge roller 45 to the transferring guide 47.

The flapper 37 of the four flappers 34, 37, 42 and 43 is driven by the flapper solenoid 56. The function of each of flappers will be explained in detail later.

Next, the document transferring mechanism 17 shown in FIG. 6 will be described with reference to the flowcharts of FIG. 7 to FIG. 10 and the diagrams of FIG. 11 to FIG. 13 showing the document transferring process.

The document transferring mechanism 17 is operated primarily in three modes, i.e. document prefeeding mode, obverse reading mode, and reverse document reading mode. From these operation modes, one mode is selected in accordance with an operation command given by an operator. Upon reception of the operation command given by the operator, the image reading carriage 7 is moved to the prescribed position to stand ready for the desired image reading operation.

Figure 7:
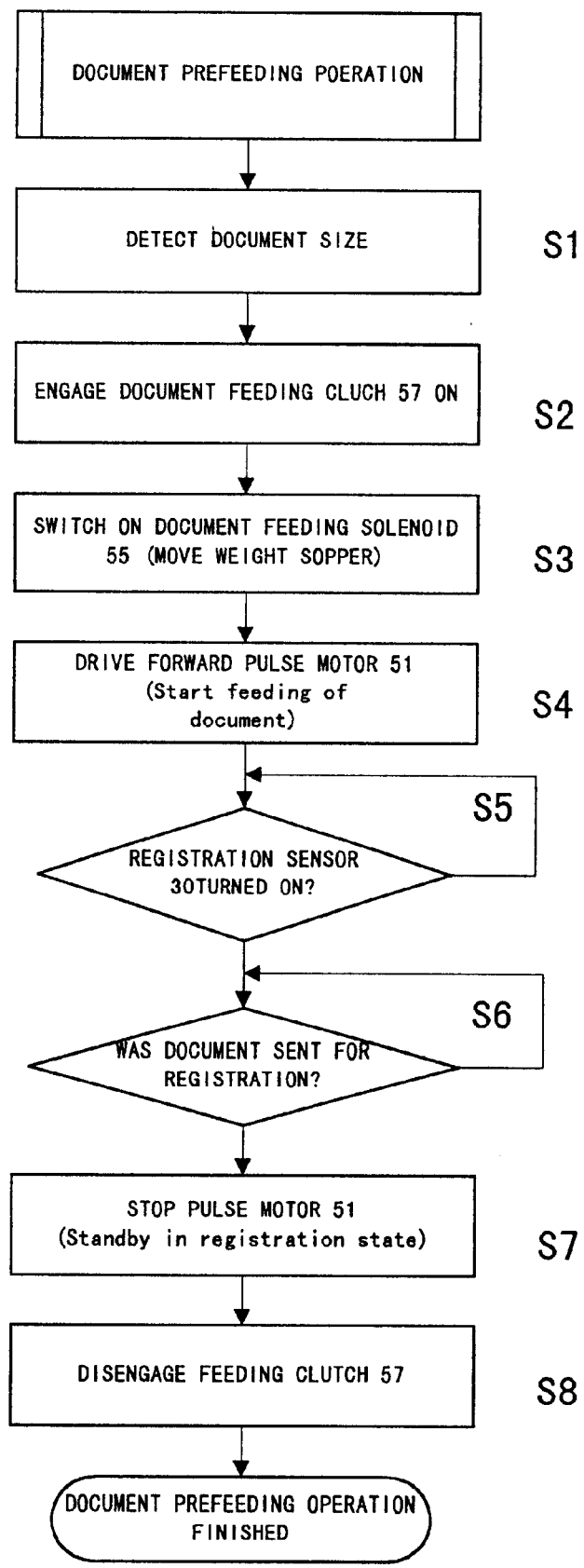
FIG. 7 is a flowchart of a process of a document prefeeding operation in the device of the invention.

FIG. 7 is the flowchart of the operation in the document prefeeding mode. First, the width of the document is detected by the size sensor 61 (S1), and then, the document feeding clutch 57 is engaged to connect the pickup roller 24 and the separation roller 26 (S2). Then, by switching on the document feeding solenoid 55, the document shutter 21 is shifted downward to release the leading ends of the documents, and the documents are depressed against the pickup roller 24 by the weight 22 (S3).

Figure 11A:
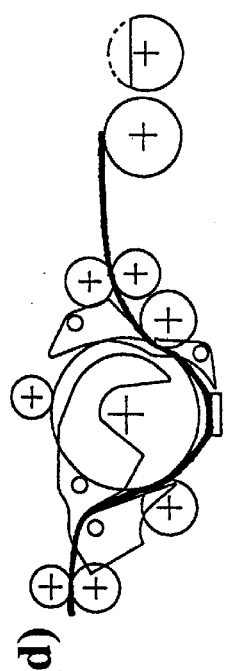
FIG. 11(a) to FIG. 11(f) are schematic side views showing movements of the document from the document prefeeding state to the state of reading the image on the obverse surface of the document.

Thereafter, the ADF pulse motor 51 is rotated in the forward direction to rotate the pickup roller 24 and the separation roller 26, thereby to start feeding one document toward the registration roller 33 (S4). FIG. 11(a) shows the relation of the document S and the principal components of the document transferring mechanism 17 immediately after starting to send the document by the separation roller 26.

Turning to the flowchart of FIG. 7, at this time, the registration sensor 30 observes the document S being fed (S5), and when the sensor 30 detects the leading end of the document S, it outputs an ON signal to the controller 60, so that the ADF pulse motor 51 is operated to move the document S by a prescribed feeding amount toward the registration roller 33 by the separation roller 26 (S6). When the document moves by the prescribed feeding amount, the ADF pulse motor 51 is stopped to bring the document S into its standby state (registration state) (S7).

Figure 11B:
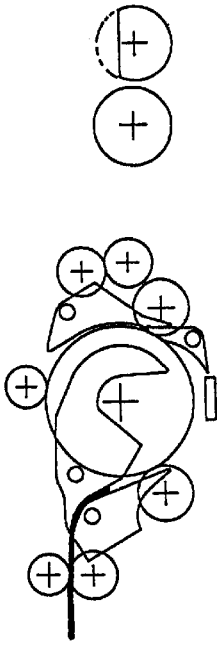

Next, the document feeding clutch 57 is disengaged to cut off the transmission of rotation from the ADF pulse motor 51 to the separation roller 26 and drive the registration roller 33 (S8). Consequently, the prefeeding operation of the document is completed. FIG. 11(b) shows the document standby state in which the leading end part of the document S reaches between the registration rollers 32 and 33 upon completion of the prefeeding operation and comes into collision with the registration rollers 32 and 33 to be slightly curved, as described above.

Figure 14A:
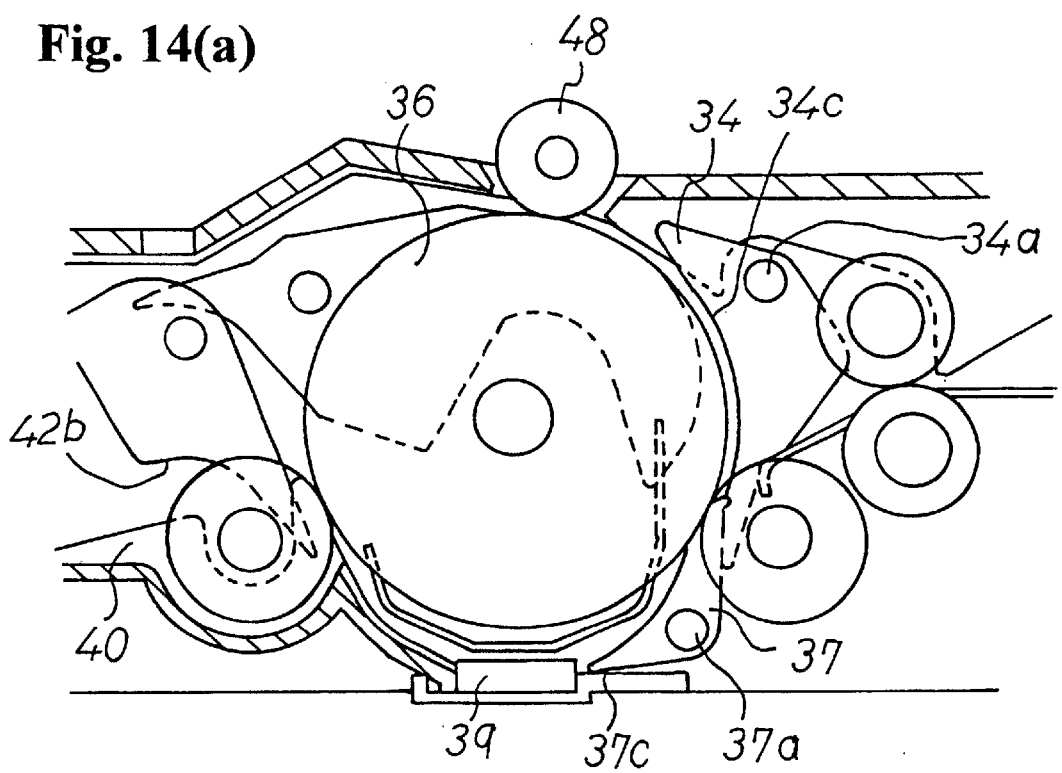
FIG. 14(a) and FIG. 14(b) are side views showing the state in which a flapper in the document transferring mechanism is switched.
Figure 14B:
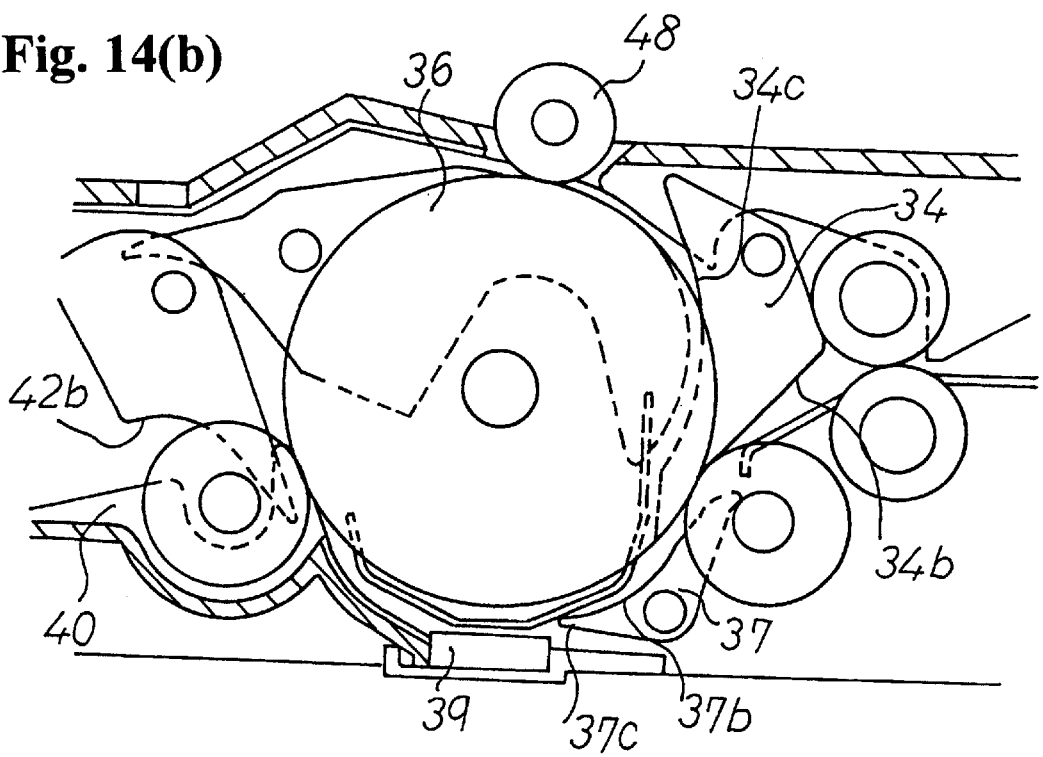

FIG. 8 is the flowchart of performing the operation of reading an image on one surface of the document, following the prefeeding operation. When receiving an operation command of reading the image on one surface of the document, the flapper solenoid 56 is switched on to change the position of the flapper 37 (S11). FIG. 14(b) shows the state in which the flapper 37 assumes its changed posture. Although, under the normal condition, the flapper 34 is elastically urged in the counterclockwise direction by an elastic member such as a spring to assume the state shown in FIG. 14(a), the flapper 34 is forced in the clockwise direction by the document S being forwarded by the registration roller 33 to be changed in position to the state shown in FIG. 14(b), consequently introducing the document S into between the transferring roller 35 and the image reading transferring roller 36. The flapper 37 has a document transferring surface having the substantially same curvature as the peripheral surface of the document transferring reading roller 36 to form a transferring passage to further forward the document nipped between the transferring roller 35 and the image reading transferring roller 36. The front end 37c of the transferring surface 37b of the flapper relative to the direction toward the ADF platen glass 39 is shifted to the position higher than the upper surface of the ADF platen glass 39. Therefore, the leading end of the document S transferred along the transferring surface 37b toward the ADF platen glass 39 is curved along the curved transferring surface 37b in the clockwise direction viewed in the drawing, thereby to send the document to the upper surface of the ADF platen glass 39 through the front end 37c of the transferring surface.

Turning to FIG. 8, at the time of switching on the flapper solenoid 56, the document discharging clutches 58 and 59 are engaged. By variously operating the document discharging clutches 58 and 59, the ADF pulse motor 51 and the discharge roller 45 can be driven in conjunction with or independently of each other. That is, the operation of the discharge roller 45 depends on the document discharging clutches 58 and 59. When bringing the discharge clutch 58 into its engaged state, the discharge roller 45 is connected to the ADF pulse motor 51 rotating in the reverse direction to rotate the discharge roller 45 in the counterclockwise direction viewed in FIG. 6, consequently to send out the document S through the document discharge port 2d (S11). By driving the ADF pulse motor 51 in the reverse direction at high speed, the document S nipped between the registration roller 32 and the registration roller 33 is forwarded toward the image reading transferring roller 36 at high speed. Further, the leading end of the document S is nipped between the image reading transferring roller 36 and the transferring roller 35, and then, the document S is forwarded downward along a part of the side surface 34b of the flapper 34.

At this time, the timing sensor 12 of the image reading carriage 7 observes whether or not the document S reaches. When the timing sensor 12 detects the document S to output an ON signal (S13), the document S is further transferred by the prescribed quantity (S14). Since the image reading transferring roller 36 is driven by the ADF pulse motor 51, the quantity of movement of the document S depends on the rotation of the ADF pulse motor 51. The rotating amount of the ADF pulse motor 51 depends on the number of the pulses given to the ADF pulse motor 51. Thus, the quantity of movement of the document S transferred by the image reading transferring roller 36 is in proportion to the number of the pulses given to the ADF pulse motor 51.

The timing sensor 12 for detecting the document S is positioned near the ADF platen glass 39 as described above. Accordingly, the document S can be precisely moved to the image reading position without causing a large positioning error even by operating the ADF pulse motor 51 from the time when the timing sensor 12 detects the document S. Besides, since the relative position of the image reading position at which the document S on the ADF platen glass 39 to the document detecting position by using the timing sensor 12 is constant, the timing of starting the image reading, i.e. the timing of positioning the document at the image reading position by driving the ADF pulse motor 51, can be stabilized even if the image reading carriage 7 or the timing sensor 12 is out of position. Thus, the heading of the image read from the document by the image reading device is by no means dislocated.

Figure 11C:
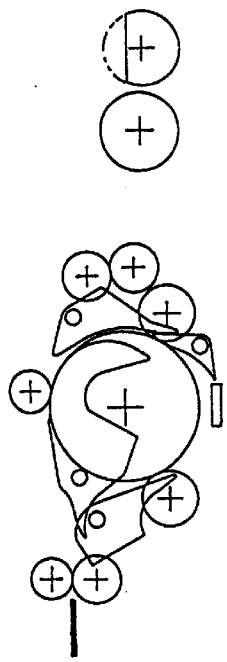
Figure 11D:
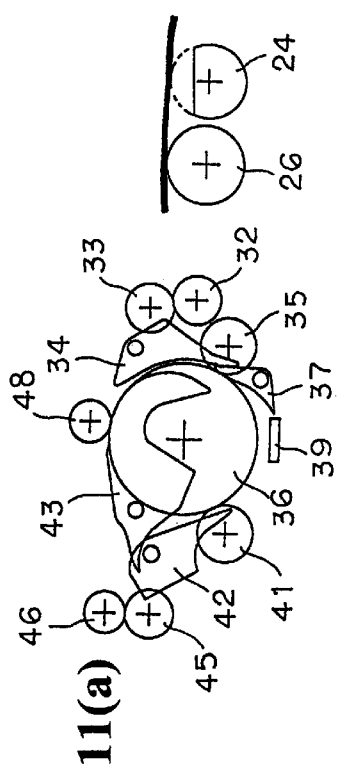

When the transfer of the document S by the prescribed quantity is confirmed (S14), the ADF pulse motor 51 is stopped for a while (S15). At this time, the document S is rest just short of the image reading position defined on the ADF platen glass 39. By the rotational force of the discharge roller 45, the flapper 42 is switched according to the direction of the rotation of the discharge roller 45. When the flapper 42 rotates in the direction of permitting the document S to be discharged by the discharge roller 45, it assumes the position shown in FIG. 14(a). FIG. 11(c) shows the state just after the step S15, in which the document S is infallibly introduced onto the upper surface of the ADF platen glass 39 by means of the flapper 37. Thereafter, by turning off the flapper solenoid 56, the flapper 37 is retracted to the position shown in FIG. 14(a) (S16). At this time, the flapper 37 is rotated to position the front end 37c thereof below the upper surface of the ADF platen glass 39, so that the document S is urged downward by the platen guide 38 to bring the leading end thereof into contact with the ADF platen glass 39. However, the front end 37c of the flapper 37 is out of contact with the document S to make the space between the platen guide 38 and the transferring surface 37b of the flapper 37 relatively large. As a result, the space in which the document S comes in contact with the ADF platen glass 39 in the transferring direction is secured, so that the image reading operation can be stably performed without causing fluctuation in positioning the image reading carriage 7, which results in decrease in image reading accuracy. Besides, since the front end 37c of the flapper 37 is out of contact with the document S, the movement of the document S is not suddenly fluctuated, so that the rear portion of the document S can also be stably read, when the tail end of the document S passing through the flapper 7 is sent onto the ADF platen glass 39.

Turning to FIG. 8, the lamp 10 is turned on to illuminate the lower surface of the document S (S17). However, the leading end of the document S does not yet reach completely the image reading position, since the document S is designed to have a prescribed distance from the image reading position at this time. So, the ADF pulse motor 51 is reversed to rotate the image reading transferring roller 36 in the clockwise direction viewed in FIG. 6, so that the document S is moved at the predetermined image reading speed (S18). While the document S moves for the prescribed distance, a decision whether or not the leading end of the document S arrives at the image reading position is made on the basis of the amount of rotation of the ADF pulse motor 51 (S19). When the document S is deemed to be moved for the prescribed distance, the image reading operation is started (S20). Under the normal condition, the flapper 43 which is elastically urged in the counterclockwise direction by an elastic member such as a torsion coil spring (not shown) assumes its normal state shown in FIG. 14(a). However, at that time, the flapper 43 is rotated in the clockwise direction due to the rigidity of the document S to be turned into the state shown in FIG. 11(d), in which the document S being transferred through the passage formed by the flapper 42 and the flapper 43 partially passes through between the discharge roller 45 and the discharge roller 46.

When the image reading operation is started, the timing sensor 12 is observed (S21). Since the timing sensor 12 is turned off when the tail end of the document S passes through a sensing position at which the timing sensor 12 is mounted, the tail end of the document S can be recognized by observing the output of the timing sensor 12. Furthermore, from the ON/OFF output of the timing sensor 12 and the amount of rotation of the ADF pulse motor 51, the length of the document can be measured. Thus, the dimension of the document to be dealt with can be recognized in conjunction with the width of the document detected at Step S1. The quantity of movement of the document transferred from the time when the timing sensor is turned off to the time when the tail end of the document arrives at the image reading position is measured from the amount of rotation of the ADF pulse motor 51 (S22). Upon transferring the document by the prescribed distance, the image reading operation is terminated (S23), and then, the ADF pulse motor 51 is stopped for a while (S24), and simultaneously, the lamp 10 is switched off (S25).

Figure 11E:
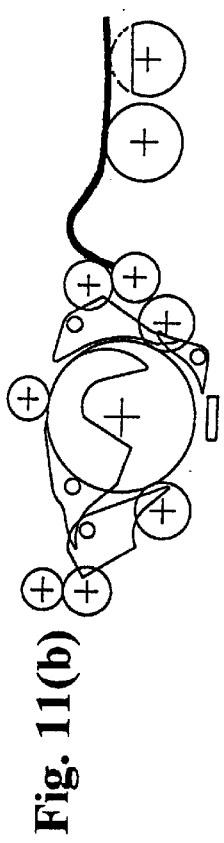
Figure 11F:
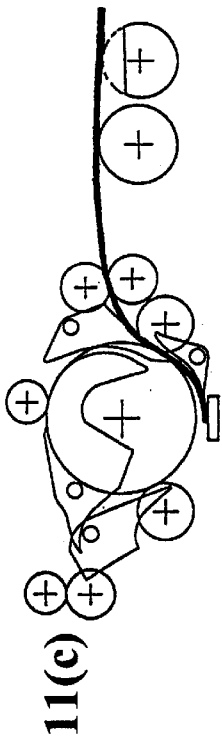

Thereafter, by reversing the ADF pulse motor 51 at high speed, the document S is transferred at high speed (S26). FIG. 11(e) shows the process of transferring the document S at high speed. Then, a decision whether the discharge sensor 62 assumes its OFF state is made (S27). After the discharge sensor 62 is turned off, the ADF pulse motor 51 is rotated by a prescribed amount to completely send out the document S through the document discharge port 2d (S28). The discharge roller 45 is driven by the ADF pulse motor 51, so that, when the ADF pulse motor 51 is reversed, the discharge roller 45 is rotated in the counterclockwise direction viewed in the drawing at the same circumferential speed as the image reading transferring roller 36. FIG. 11(f) shows the state in which the document S is discharged through the document discharge port 2d onto the cover 15 shown in FIG. 6 by being transferred by the prescribed amount after the discharge sensor 62 is turned off.

Figure 9:
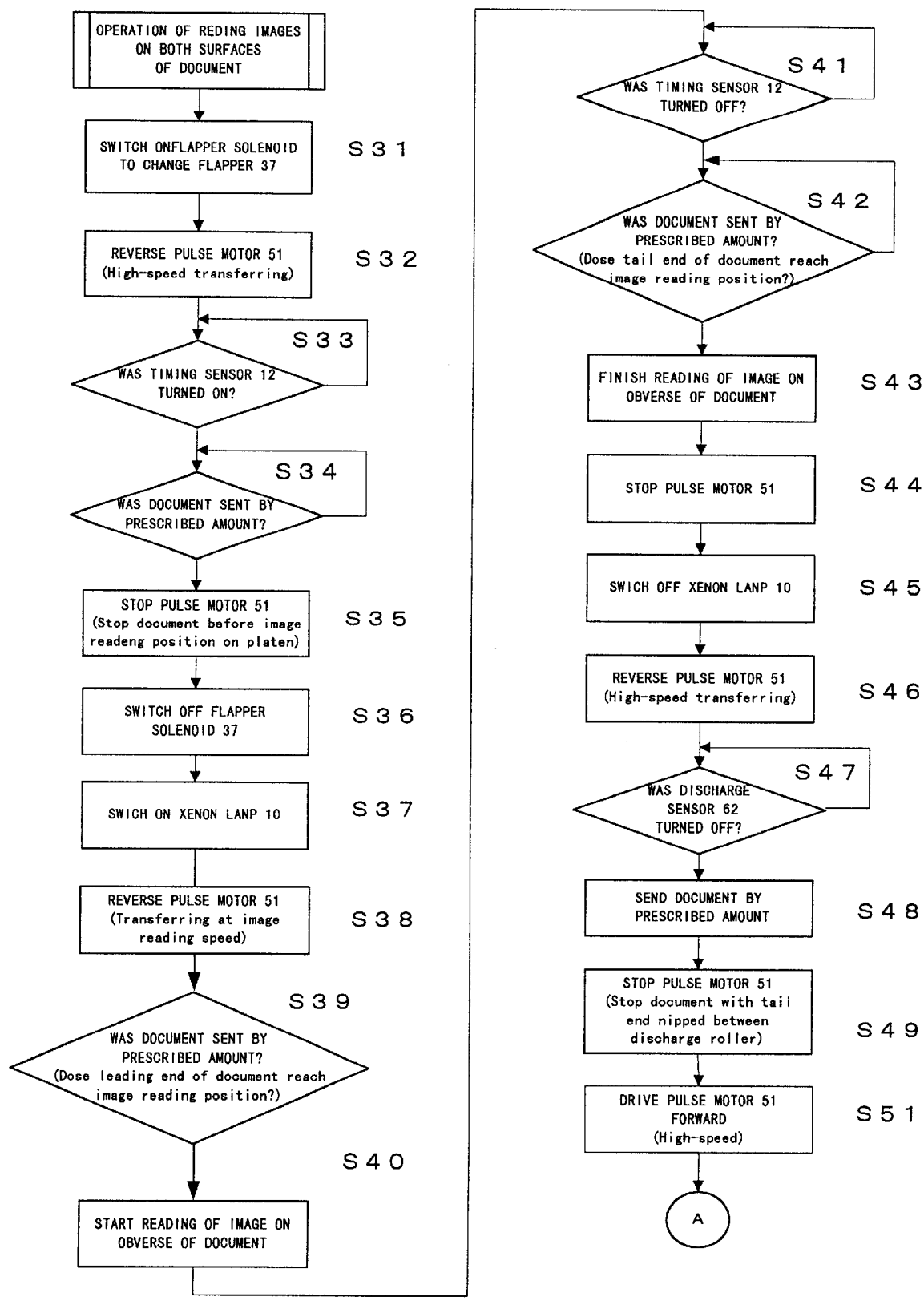
FIG. 9 is a flowchart of a process for reading images on both image surfaces of the document in the device of the invention.

FIG. 9 and FIG. 10 are flowcharts of the process of reading images on the both surfaces of the document, following the document prefeeding process described above. After receiving a command for reading the images on the both surfaces of the document, a series of procedures from Step S31 at which the flapper solenoid 56 is turned on to Step S47 at which a decision whether the discharge sensor 62 is turned off is made, which is the same as Step S11 to Step S27 shown in FIG. 8. Accordingly, the processes of transferring the document S as shown in FIGS. 12(a) to 12(e) are also the same as those of FIGS. 11(a) to 11(e). When the discharge sensor 62 is decided to assume its OFF state at Step S47, the transferring of the document by the prescribed amount is performed (S48). The prescribed amount corresponds to the amount by which the document S is transferred just before the document is completely sent out by means of the discharge rollers 45 and 46, that is, by which the tail end of the document S passes through the transferring passage formed by the flapper 43. Next, by stopping the ADF pulse motor 51 (S49), the tail end of the document S stops while being partially nipped between the discharge roller 45 and the discharge roller 46 (first turning path). When the tail end of the document S passes through the front end of the flapper 43, the flapper 43 is automatically changed in its posture by the urging force of the elastic member such as a spring. As a result, the transferring passage extending toward the registration small roller 48 is formed between the flapper 43 and the transferring guide 47. Next, by operating the ADF pulse motor in the forward direction at high speed, the discharge roller 45 is reversed in the clockwise direction to move backward the document S from the tail end thereof toward the registration small roller 48 (S51). Then, a decision whether the tail end of the document S is detected by the discharge sensor 62 is made (S52). Upon confirming the ON state of the discharge sensor 62 as the result of detecting the tail end of the document S, a decision whether the document S is transferred by the prescribed amount for standby to perform registration transferring is made on the basis of the rotating amount of the ADF pulse motor 51 (S53). At this time, the tail end of the document S advances along the transferring passage formed the transferring guide 47 and the flapper 43 changed in posture toward the registration small roller 48, but the tail end of the document S is kept from further advancing before the registration small roller 48 by the image reading transferring roller 36 which rotates in the counterclockwise direction viewed in FIG. 6, as shown in FIG. 12(f). As a result, the tail end portion of the document S is partially curved upwardly (see FIG. 6). Since the discharge roller 45 rotates in the clockwise direction viewed in FIG. 12(f), the flapper 42 is rotated upward in the counterclockwise direction as shown in FIG. 12(f).

When the document is forwarded by the prescribed amount to be curved, the ADF pulse motor 51 is stopped to bring the document S into its standby state for reading image on the reverse surface of the document (registration state for the reverse surface) (S54). Then, the discharge clutch 58 for connecting the ADF pulse motor 51 to the discharge roller 45 is disengaged to bring the discharge roller 45 into the free rotating state (S55). At the time, the flapper solenoid 56 is turned on to bring the flapper 37 into the state shown in FIG. 14(b).

Next, the ADF pulse motor is reversed at high speed to rotate the image reading transferring roller 36 at high speed in the clockwise direction viewed in FIG. 6 (S57). The document S placed between the image reading transferring roller 36 and the flapper 34 is forwarded onto the ADF platen glass 39 along a part of the side surface 34c of the flapper 34 (see FIG. 14) and the transferring surface 37b, and then, the document further advances along a part of the curved surface 42c of the flapper 42 (second turning path). FIG. 13(a) and FIG. 13(b) show the processes of transferring the document S.

At this time, the timing sensor 12 of the image reading carriage 7 observes whether the leading end of the document S (front end of the document S in the direction opposite to the transferring direction) passes by the timing sensor. The timing sensor 12 outputs an OFF signal when the document passes thereby. When the output of the timing sensor 12 is the OFF signal (S58), the document S is transferred by the prescribed amount (S59). As already stated above, the sensing position at which the document S is detected by the timing sensor 12 is very close to the ADF platen glass 39. Accordingly, in order for bringing the leading end of the document to the image reading position, it is sufficient to move the document a little by operating the ADF pulse motor 51 from the time the leading end of the document is detected. Thus, the document can be accurately transferred to the image reading position without causing a large positioning error.

When confirming that the document S is transferred by the prescribed amount from the rotating amount of the ADF pulse motor 51, the ADF pulse motor 51 is stopped (S60). Simultaneously, the flapper solenoid 56 for the flapper 37 is switched off to reverse the direction in which the document S is transferred (S61). That is, the flapper 37 is rotated to permit the front end 37c thereof to retract below the upper surface of the platen glass 39 as shown in FIG. 14(*a*). FIG. 13(*c*) shows the relation between the document S and the flapper at that time, in which the leading end of the document S is rest just before the image reading position on the ADF platen glass 39.

Next, the discharge clutch 58 is disengaged and the discharge clutch 59 is engaged to transmit the forward rotation of the ADF pulse motor 51 to the discharge roller 45, so that the document S is transferred in the discharge direction by the discharge rollers 45 and 46 to be sent out through the document entrance port 2c (S62). Thereafter, the lamp 10 is switched on to illuminate the lower surface of the document S (S63).

Next, the ADF pulse motor 51 is driven in the forward direction to rotate the image reading transferring roller 36 in the counterclockwise direction viewed in FIG. 6, consequently to forward the document S from the leading end thereof in the reverse direction at the prescribed image reading speed (S64). The forward rotation of the ADF pulse motor 51 causes the discharge roller 45 to rotate in the counterclockwise direction, thus forcing the flapper 42 to rotate in the clockwise direction. However, since the flapper 42 is connected to the discharge roller 45 through a not-illustrated torque limiter, when the document comes in partial contact with the document S, the flapper 42 withstands the rotational force of the discharge roller 45 due to the torque limiter to endure rotating. Accordingly, the document S is not excessively pressed downward by the flapper 42 due to the torque limiter interposed between the flapper 42 and the discharge roller 45, so that the document can be transferred through between the flapper 42 and the discharge roller 45 without interference with the flapper 42.

Next, a decision whether the leading end of the document S reaches the image reading position is made on the basis of the rotating amount of the ADF pulse motor 51 (S65). When the rotating amount of the ADF pulse motor 51 reaches the prescribed value to move the document to the image reading position, the image reading operation is started from the leading end of the document (S66).

The leading end of the document S is transferred along the passages formed around the image reading transferring roller 36 by the transferring surface 37b of the flapper 37 and a part of the side surface 34c of the flapper 34 (see FIG. 14(*a*)), and advances along the passage formed between the flapper 43 and the transferring guide 47 toward the discharge rollers 45 and 46 through the registration small roller 48. FIG. 13(*d*) shows the state in the process of reading the document S. The timing sensor 12 is operated to watch for the tail end of the document S passing thereby at all times. Thus, a decision whether the timing sensor 12 issues an OFF signal as the result that the tail end of the document S passes by the timing sensor is made (S67). When the timing sensor 12 issues the OFF signal, the image reading operation on the reverse surface of the document is terminated (S67) to stop the ADF pulse motor 51 for a while (S69). Then, the lamp 10 is switched off (S70), and the ADF pulse motor 51 is operated in the forward direction at high speed so as to transfer the document S at a speed higher than that of reading the image on the document (S71). FIG. 13(*e*) shows the document transferring state in which the document S is transferred toward the discharge rollers 45 and 46 through the flappers 37 and 34 and the transferring guide 47.

At this time, the discharge sensor 62 checks whether the document S passes thereby. When the document S completely passes therethrough, the discharge sensor 62 assumes its OFF state. Therefore, when an OFF signal is issued from the discharge sensor 62 (S72), the document is further transferred by a prescribed amount so as to be completely sent out through the document discharge port 2d by the discharge rollers 45 and 46 as shown in FIG. 13(*f*) (S73).

As described above, according to the document transferring mechanism 17 of the image reading device 1 of the invention, the image reading can always be carried out from the same end of the document S in reading the image on either of the obverse and reverse surfaces of the document. That is, the document is invariably read from its same end regardless of whether the obverse surface or reverse surface is scanned, and the image thus read can reliably be reproduced on a sheet of paper. Moreover, when turning the document upside down, the leading end and tail end of the document S do not overlap each other even if the document transferring mechanism is made small in dimensions.

Next, a modified embodiment of the document transferring mechanism 17 for performing the operation for reading images on the both surfaces of the document will be described with reference to FIGS. 15(*a*) and 15(*b*) showing schematically the process of transferring the document. However, the process of transferring the document is not limited to that shown in FIGS. 15(*a*) and 15(*b*). The image reading position in this embodiment corresponds to the position illuminated with light emitted from the image reading carriage 7, from which the light illuminated is reflected and incident on the CCD 5. The document transferring passage is depicted by the solid line, and the direction of transferring the document is depicted by the dotted line in these drawings.

First, the document is transferred from one side of the mechanism toward the image reading position to read the image on the obverse surface of the document (A1). Subsequently, the document is moved backward with the rotation of the image reading transferring roller 36 used in FIG. 6, thus to be forwarded from the tail end of the document along the curved peripheral surface of the image reading transferring roller 36 in the clockwise direction (A2). At this time, the document passes through the image reading position, but image reading is not effected. After the leading end of the document passes through the image reading position, the direction of transferring the document is reversed to forward the document from the leading end thereof in the direction opposite to that in which the document is transferred to read the image on the obverse surface of the document (A3). Then, upon reading the image on the reverse surface of the document S, the document is discharged.

Figure 15A:
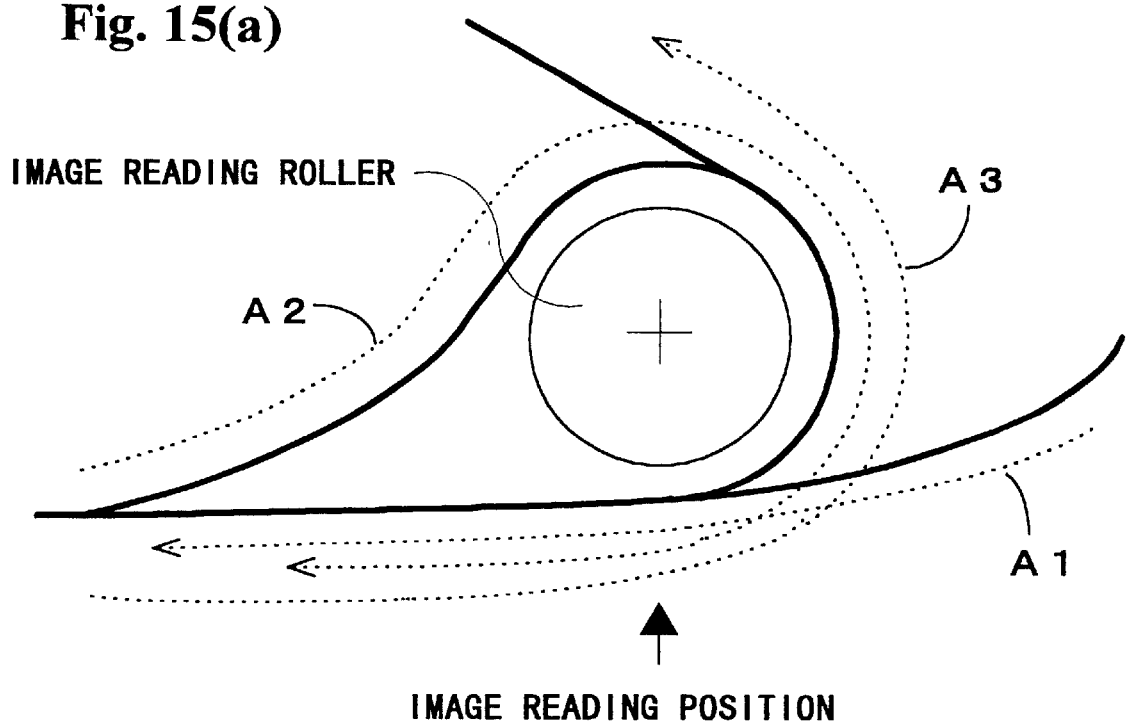
FIG. 15(a) and FIG. 15(b) are side views showing a document transferring manner in a modified embodiment of the document transferring mechanism of the invention.
Figure 15B:
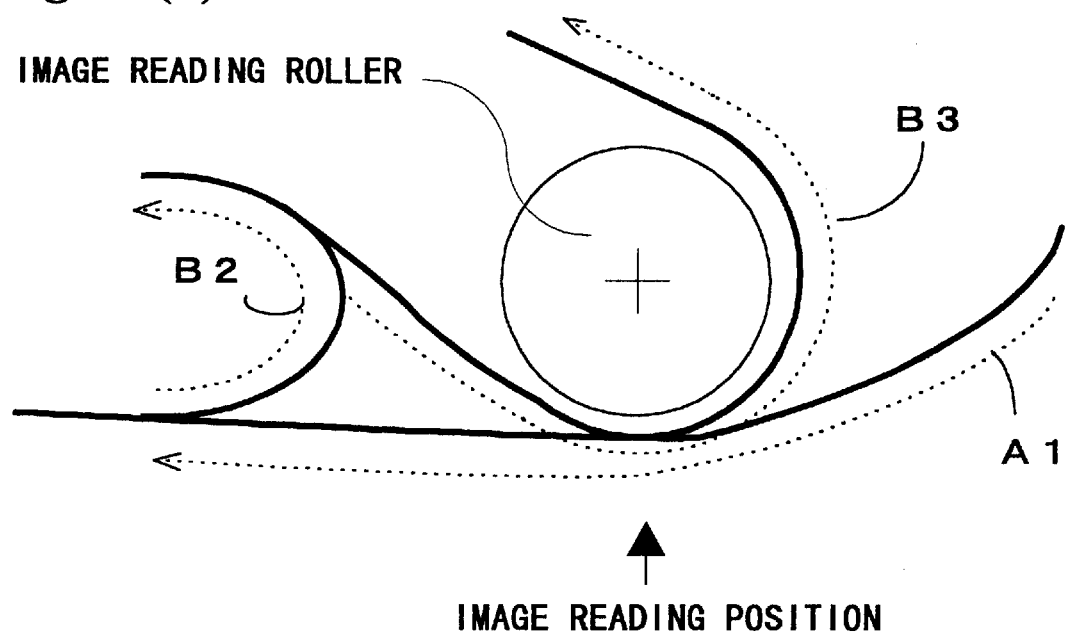
Figure 16A:
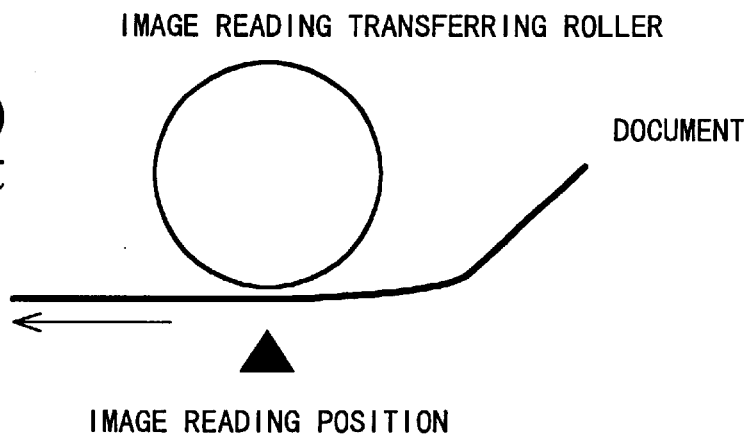
FIG. 16(a) to FIG. 16(d) show a document transferring mechanism in a first conventional image reading device.
Figure 16B:
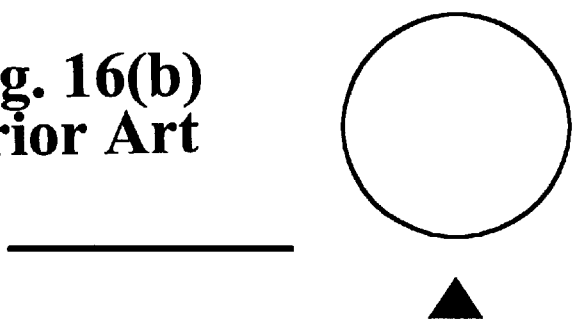
Figure 16C:
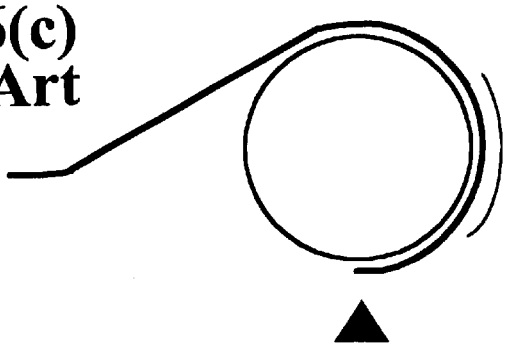
Figure 16D:
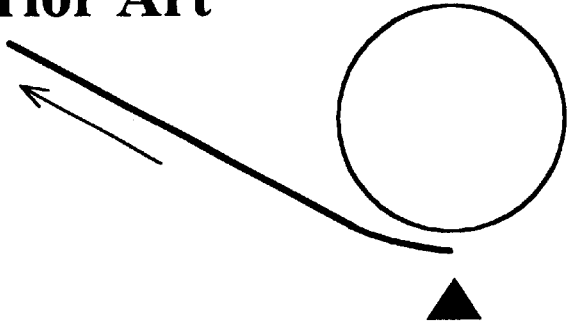
Figure 17A:
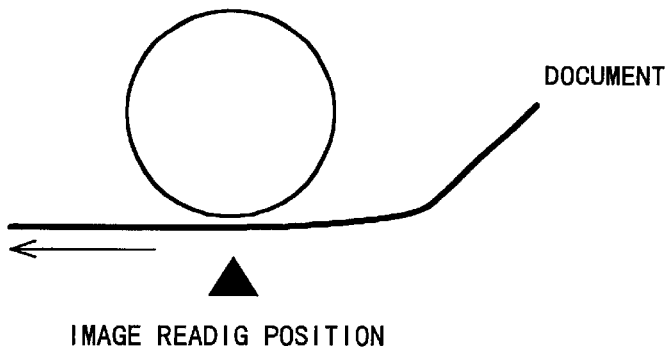
FIG. 17(a) to FIG. 17(d) show a document transferring mechanism in a second conventional image reading device.
Figure 17B:
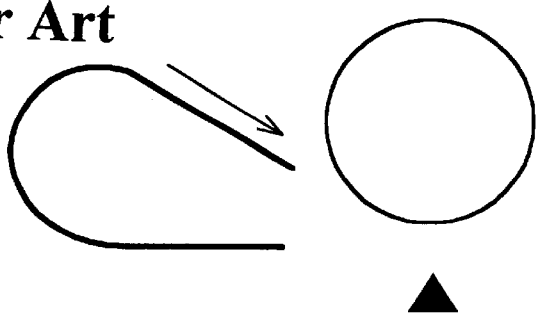
Figure 17C:
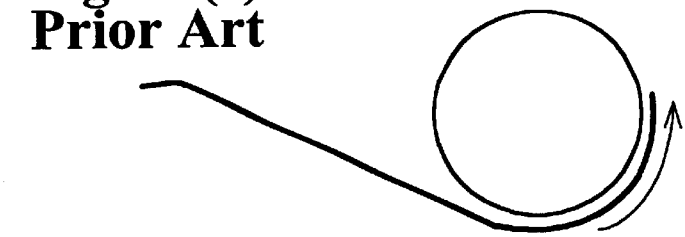
Figure 17D:
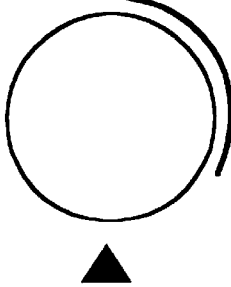

The document in the process of FIG. 15(b) is transferred from the one side of the mechanism toward the image reading position in the same manner (A1) as that shown in FIG. 15(a). Then, the document is moved backward (B2) to be turned upside down, and forwarded from the leading end thereof toward the image reading position. Subsequently, the document S is moved backward from the leading end thereof in the direction opposite to that in which the document is first transferred, and then, is discharged upon performing the image reading (B3).

The processes of reading the image on the first surface of the document moving in the first direction (forward direction), and then, turning the document upside down to read the image on the second surface of the document in the embodiment shown in FIGS. 15(a) and 15(b) are fulfilled in the same manner as those in the foregoing embodiment shown in FIGS. 12(a) to 12(f) and FIGS. 13(a) to 13(f). According to this embodiment, the image reading can always be carried out from the same end of the document in reading the image on either of the obverse and reverse surfaces of the document. That is, the document is invariably read from its same end regardless of whether the obverse surface or reverse surface is scanned, and the image thus read can reliably be reproduced on a sheet of paper. Moreover, when turning the document upside down, the leading end and tail end of the document S do not overlap each other even if the document transferring mechanism is made small in dimensions.

Although the present invention has been described with reference to FIGS. 12(a) to 12(f), FIGS. 13(a) to 13(f) and FIGS. 15(a) and 15(b), it is to be understood that the invention is not limited to the specific embodiments thereof. For example, in the embodiment of FIG. 15(b), the document S may be transferred in the reverse direction from the route B3 to the route B2 through the route A1.

What is claimed is:

1. An image reading device for reading images on both obverse and reverse surfaces of a document moving at a prescribed speed, comprising:

a platen for reading the images of said document moving at said prescribed speed, reversible transferring means disposed adjacent to said platen for moving said document at said prescribed speed along said platen, a sheet guide situated adjacent to the reversible transferring means and disposed at one side of the platen, said sheet guide being movable to have an upper position higher than an upper surface of the platen for leading the document onto the platen and a lower position lower than the upper surface of the platen for receiving the document from the platen, and a circulating passage for turning said document and sending back to said platen after reading the image on said obverse surface of said document.

2. An image reading device according to claim 1, further comprising a second platen disposed adjacent to said platen for placing a document to be read thereon, and a platen cover for covering said second platen.

3. An image reading device according to claim 2, further comprising a document feeding tray and a document discharge tray, which are disposed along with said platen cover on said second platen in an openable state over said second platen.

4. An image reading device according to claim 1, wherein said circulating passage includes a document transferring passage disposed around the reversible transferring means, and first and second turning paths communicating with the document transferring passage for inverting a direction of the document to turn the document upside down.

5. An image reading device according to claim 4, wherein said first turning path constitutes an ejecting path and is located above the second turning path, said document transferring passage including a turning path as a part thereof.

6. An image reading device according to claim 4, further comprising a second sheet guide situated at a side opposite to said sheet guide relative to the platen, said second sheet guide selectively guiding the document to one of the first and second turning paths.

* * * * *